US009850894B2

(12) United States Patent
Cannata

(10) Patent No.: US 9,850,894 B2
(45) Date of Patent: Dec. 26, 2017

(54) SELF PRIMING HYDRAULIC PUMP AND CIRCUIT

(71) Applicant: Tonand Inc., London (CA)

(72) Inventor: Antonio Cannata, London (CA)

(73) Assignee: TONAND INC., London (CA)

( * ) Notice: Subject to any disclaimer, the term of this patent is extended or adjusted under 35 U.S.C. 154(b) by 394 days.

(21) Appl. No.: 14/607,115

(22) Filed: Jan. 28, 2015

(65) Prior Publication Data

US 2016/0215797 A1 Jul. 28, 2016

(51) Int. Cl.

| | |
|---|---|
| ***F16D 31/02*** | (2006.01) |
| ***F04B 53/16*** | (2006.01) |
| ***F04B 23/06*** | (2006.01) |
| ***F15B 1/02*** | (2006.01) |
| ***F04B 9/04*** | (2006.01) |
| ***F15B 21/04*** | (2006.01) |
| ***F15B 21/00*** | (2006.01) |
| ***F04B 5/02*** | (2006.01) |

(52) U.S. Cl.

CPC ................ *F04B 53/16* (2013.01); *F04B 5/02* (2013.01); *F04B 9/04* (2013.01); *F04B 23/06* (2013.01); *F15B 1/02* (2013.01); *F15B 21/005* (2013.01); *F15B 21/044* (2013.01); *F15B 2211/20538* (2013.01); *F15B 2211/20576* (2013.01); *F15B 2211/625* (2013.01); *F15B 2211/851* (2013.01)

(58) Field of Classification Search

CPC ............. F15B 1/02; F15B 11/15; F04B 9/042

See application file for complete search history.

(56) References Cited

FOREIGN PATENT DOCUMENTS

| | | |
|---|---|---|
| DE | 2646583 A1 | 4/1978 |
| DE | 3529278 A1 | 2/1987 |

OTHER PUBLICATIONS

International Search Report and Written Opinion dated Apr. 13, 2016 in PCT Patent Application No. PCT/CA2016/000020.

*Primary Examiner* — Michael Leslie

(74) *Attorney, Agent, or Firm* — Grant Tisdall; Gowling WLG (Canada) LLP

(57) ABSTRACT

A closed loop, self-priming hydraulic system comprising a reciprocating, hydraulic piston pump, a high pressure loop and a low pressure loop is disclosed. The reciprocating, hydraulic piston pump comprises a first piston operating in a first piston bore and a second piston operating in a second piston bore. The high pressure loop is defined by a high pressure accumulator that is fluidly connected to an inlet of the first piston bore and an outlet of the second piston bore. The low pressure loop is defined by a low pressure accumulator that is fluidly connected to an inlet of the second piston bore and an outlet of the first piston bore. The closed-loop, self-priming hydraulic system manipulates a hydraulic fluid to convert energy from one form to another.

11 Claims, 12 Drawing Sheets

SELF PRIMING HYDRAULIC PUMP AND CIRCUIT

TECHNICAL FIELD

The present disclosure relates to the field of reciprocating hydraulic devices.

BACKGROUND

Today, hydraulic systems are widely used by manufacturing, construction, power generation, mining and transportation industries. Over the years, systems for the harnessing and distribution of power have become increasingly sophisticated, their applications more numerous and their operating conditions more demanding. Hydraulic systems are particularly advantageous in that they allow for actuation of large surfaces under heavy loads with minimal input, due to the fact that hydraulic fluid resists compression (i.e. incompressible) and therefore facilitates the direct transfer of applied work to the actuated surfaces. Hydraulic systems also offer an advantage of being more powerful than an electrical system of the same size, particularly in heavy load applications.

Hydraulic systems involving reciprocating piston pumps and motors can provide efficient power transfer mechanisms in alternative energy conversion systems, however hydraulic fluid movement between the hydraulic pump and motor can be problematic during system start-up and other non-steady state operating conditions. Priming of a reciprocating piston hydraulic pump in a open loop can be very difficult, as the ability for the pump piston to draw its own hydraulic fluid into the respective bore inlet is limited due the force required to overcome inertia in circulation of the hydraulic fluid between the pump and reservoir. This problem in draw ability of the pump is analogous to the age-old problem of pushing a rope, as the pump must overcome inertia of the hydraulic fluid in the system in order to begin operation.

The priming (and other non-steady state conditions) problem is exacerbated if the hydraulic reciprocating piston pump is located at a head height above the reciprocating piston hydraulic motor and reservoir tank in the open loop system, as the piston must draw the hydraulic fluid under further influence of gravity. This problem of inertia is further exaggerated by the pump size (i.e. bore/stroke), inlet hydraulic fluid volume (i.e. bore inlet diameter) and/or separation between the pump and motor increase(s) in magnitude, or if the pump piston (s) decouples from the actuator driving the pump.

The current solution employed for the aforementioned problems is the provision of an open loop hydraulic system, in which a reservoir is positioned at higher altitude than the pump and the pump pistons are fixed to the actuator (do not decouple) or in some applications, a supplemental pump or other priming device is used to supply hydraulic fluid to the main, more efficient pump. However, the open loop system is undesirable, as the supplemental pump increases the complexity and can decrease the efficiency of the hydraulic system. Also, in applications where space and accessibility to the hydraulic pump(s) are limited or difficult, the use of an open loop storage reservoir system is unworkable and undesirable.

One exemplary application of pump-motor hydraulic systems is for a hydraulic wind turbine, where blade rotation is converted to hydraulic flow using a hydraulic pump, pressure of hydraulic flow is generated by an opposing load or resistance, and the hydraulic pressure is converted to electrical energy using a hydraulic motor coupled to an electrical generator.

SUMMARY

It is an object of the present invention to provide a self-priming, self-sustaining hydraulic system that obviates or mitigates at least one of the above presented disadvantages.

In one embodiment, the self-priming hydraulic system comprises a hydraulic pump, the hydraulic pump comprising a first piston operable to reciprocate within a first piston bore, the first piston bore co-operating with a surface of the first piston to define a first fluid cavity, the first piston bore providing a first fluid inlet and a first fluid outlet disposed on the first piston bore and fluidly coupled to the first fluid cavity, and a second piston operable to reciprocate within a second piston bore, the second piston bore co-operating with a top surface of the second piston to define a second fluid cavity, the second piston bore providing a second fluid inlet and a second fluid outlet disposed on the second piston bore and fluidly coupled to the second fluid cavity. The self-priming hydraulic system also comprises a low pressure loop defined by a low pressure accumulator fluidly coupled to the first fluid outlet and the second fluid inlet of the hydraulic pump, and a high pressure loop defined by a high pressure accumulator fluidly coupled to the second fluid outlet and the first fluid inlet of the hydraulic pump.

According to another aspect, the low pressure loop of the self priming hydraulic system comprises a resistive element disposed between and fluidly coupled to the low pressure accumulator and the first fluid outlet of the hydraulic pump.

According to another aspect, the resistive element of the self-priming hydraulic system is a hydraulic motor.

According to another aspect, the hydraulic motor of the self-priming hydraulic system is a reciprocating hydraulic motor.

According to another aspect, the first piston and the second piston of the self-priming hydraulic system are arranged in a stacked configuration such that the first piston is coupled to the second piston by a stem.

According to another aspect, a relief line fluidly couples the high pressure accumulator to the low pressure accumulator in the self-priming hydraulic system.

According to another aspect, the low pressure loop further comprises a heat exchanger disposed between and fluidly coupled to the resistive element and the low pressure accumulator.

According to another aspect, a reciprocating hydraulic motor of the self-priming hydraulic system comprises a capillary tube fluidly coupled to a compressible fluid storage tank.

According to another aspect, a dual fluid accumulator of the self-priming hydraulic system is fluidly coupled to the low pressure accumulator to provide a relief for the low pressure accumulator.

According to another aspect, a first fluid support fluidly couples the high pressure loop to the low pressure loop upstream of the resistive element to direct non-compressible fluid from the high pressure loop to the low pressure loop, and a second fluid support fluidly couples the low pressure loop downstream of the resistive element to the high pressure loop to direct non-compressible fluid from the low pressure loop to the high pressure loop.

According to another aspect, the self-priming hydraulic system comprises a hydraulic pump, the hydraulic pump comprising a first piston operable to reciprocate within a first piston bore, the first piston bore co-operating with a surface of the first piston to define a first fluid cavity, the first piston bore providing a first fluid inlet and a first fluid outlet disposed on the first piston bore and fluidly coupled to the first fluid cavity, and a second piston operable to reciprocate within a second piston bore, the second piston bore co-operating with a top surface of the second piston to define a second fluid cavity, the second piston bore providing a second fluid inlet and a second fluid outlet disposed on the second piston bore and fluidly coupled to the second fluid cavity. The self-priming hydraulic system also comprises a low pressure loop defined by a low pressure accumulator fluidly coupled to the first fluid inlet and the first fluid outlet of the hydraulic pump, and a high pressure loop defined by a high pressure accumulator fluidly coupled to the second fluid inlet and the second fluid outlet of the hydraulic pump.

BRIEF DESCRIPTION OF THE DRAWINGS

Further features and advantages of the present disclosure will become apparent from the following detailed description, taken in combination with the appended drawings, in which.

It will be noted that throughout the appended drawings, like features are identified by like reference numerals.

DETAILED DESCRIPTION

Figure 1A:
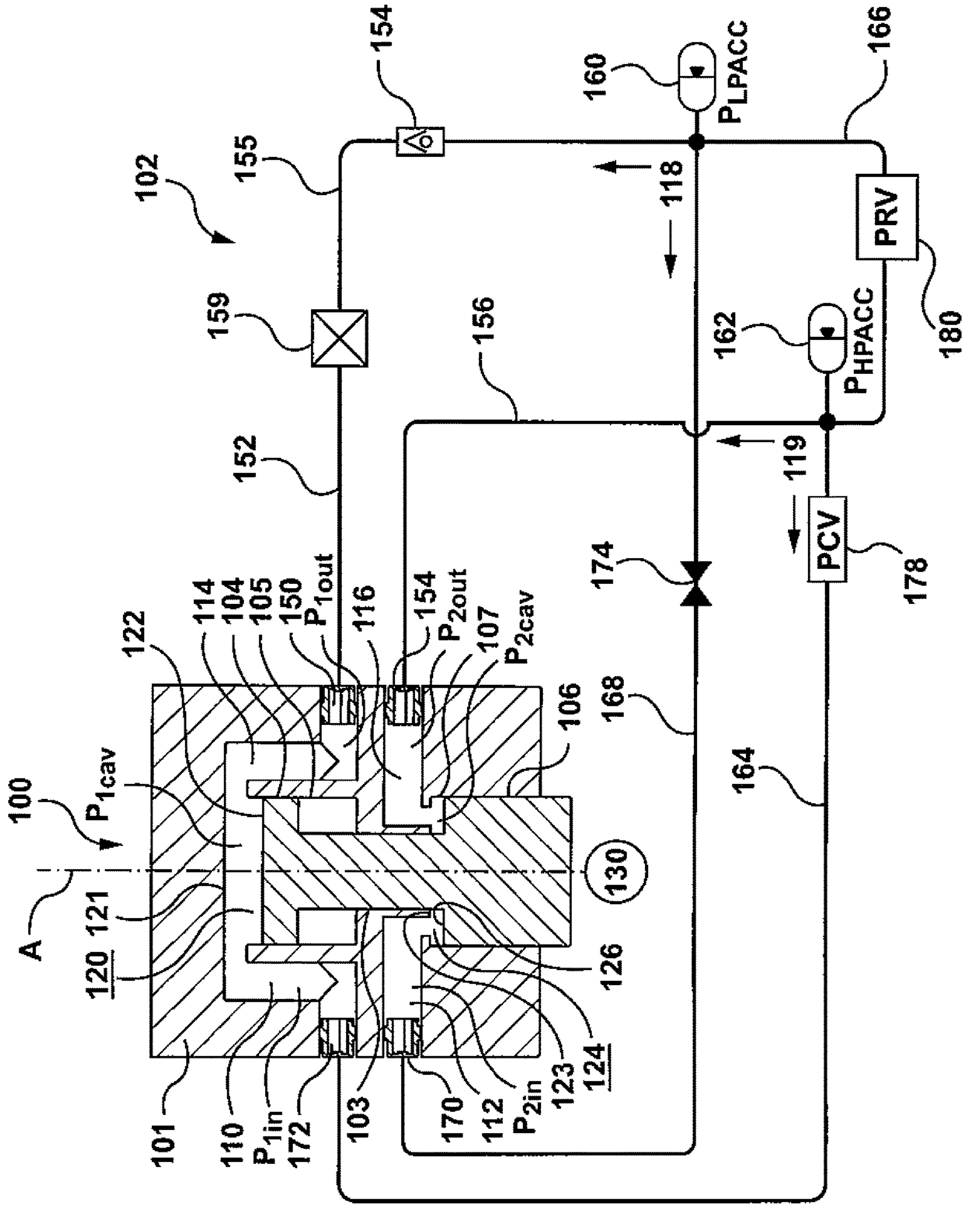
FIGS. 1A and 1B show cross-section views of a double-decker embodiment of a self-priming pump and circuit where a first piston and a second piston are shown in their top dead center (TDC) and bottom dead center (BDC) positions.

Embodiments are described below, by way of example, with reference to FIGS. 1 to 7. The embodiments described and depicted herein provide a self-priming hydraulic system.

It will be understood that the terms “top” and “bottom” referred to herein are used in the context of the attached Figures. The terms are not necessarily reflective of the orientation of reciprocating hydraulic pump 100 in actual use and are therefore not meant to be limiting in their use herein.

Described herein are various embodiments for a self-priming hydraulic system that provides for the manipulation of a non-compressible fluid to generate and perform work through the use of inherent properties of a non-compressible fluid as further described below.

The self-priming hydraulic system includes the reciprocating hydraulic pump with a first piston operable to reciprocate within a first piston bore, the first piston bore co-operating with a top surface of the first piston to define a first fluid cavity, the first piston bore providing a first fluid inlet and a first fluid outlet disposed on the first piston bore and fluidly coupled to the first fluid cavity. A surface of the piston bore (e.g. opposing bore wall to the top surface of the first piston) can be variable in position during the operating cycle of the hydraulic pump, thus providing for an increase or decrease in bore volume of the first fluid cavity as experienced by the first piston during travel between TDC and BDC. Position of the variable position surface (e.g. a piston also referred to as a floating piston) can be controlled by a resilient element (e.g. compressible fluid) chamber positioned behind the variable position surface, such that the variable position surface is located between the resilient element chamber and the first fluid cavity. For example, as volume of the resilient element (e.g. compressed fluid) is decreased in the resilient element chamber (e.g. via ejection of compressible fluid therefrom), the position of the variable position surface will become biased away from the first piston and thus provide for an increased volume of the first fluid cavity experienced by the first piston. Alternatively, as volume of the resilient element (e.g. compressed fluid) is increased in the resilient element chamber (e.g. via injection of compressible fluid therein), the position of the variable position surface will become biased towards the first piston and thus provide for a decreased volume of the first fluid cavity experienced by the first piston. Control in position of the variable position surface can be provided for (e.g. electronic control of injection/ejection of fluid with respect to the resilient element chamber in response to sensed operating conditions such as pressure, speed, and/or position experienced by the pump pistons, and/or in response to sensed operating conditions such as pressure, speed, and/or position experienced by the motor piston) during travel of the first piston between TDC and BDC while the pump is in operation.

The hydraulic system also has a second piston operable to reciprocate within a second piston bore, the second piston bore co-operating with a top surface of the second piston to define a second fluid cavity, the second piston bore providing a second fluid inlet and a second fluid outlet disposed on the second piston bore and fluidly coupled to the second fluid cavity. Reciprocation of the second piston is coupled to reciprocation of the first piston, as herein described by numerous examples, in order to synchronize positioning of the first piston within the first piston bore to positioning of the second piston within the second piston bore. For example, the piston coupling mechanism (e.g. couple 103, 503 in FIGS. 1A and 5B, respectively) can be used to synchronize travel of the first piston towards BDC within the first fluid cavity at the same time as travel of the second piston towards BDC within the second fluid cavity. For example, the piston coupling mechanism (e.g. couple 103, 503 in FIGS. 1A and 5B, respectively) can be used to synchronize travel of the first piston towards TDC within the first fluid cavity at the same time as travel of the second piston towards TDC within the second fluid cavity. Alternatively, in some configurations as described, the piston coupling mechanism (e.g. couple 103,503 in FIGS. 1A and 5B, respectively) can be used to synchronize travel of the first piston towards TDC within the first fluid cavity at the same time as travel of the second piston towards BDC within the second fluid cavity. Alternatively, in some configurations as described, the piston coupling mechanism (e.g. couple 103,503 in FIGS. 1A and 5B, respectively) can be used to synchronize travel of the first piston towards BDC within the first fluid cavity at the same time as travel of the second piston towards TDC within the second fluid cavity.

The hydraulic system also has a first loop (e.g. a low pressure loop) defined by a low pressure accumulator fluidly coupled to the first fluid outlet and the second fluid inlet of the hydraulic pump. The first loop is a closed loop for the hydraulic fluid circulating between the first fluid outlet and the second fluid inlet. The hydraulic system also has a second loop (e.g. a high pressure loop) defined by a high pressure accumulator fluidly coupled to the second fluid outlet and the first fluid inlet of the hydraulic pump. The second loop is a closed loop for the hydraulic fluid circulating between the second fluid outlet and the first fluid inlet of the hydraulic pump. It is also recognised that the high pressure accumulator contains hydraulic fluid at a pressure higher than the pressure of the hydraulic fluid contained in the low pressure accumulator. Examples relative pressures of the high and low pressure accumulators can be 500 psi and 100 psi, respectively.

It should be understood that the self-priming hydraulic system can be described in a number of different configurations with a number of different components. For instance, the self-priming hydraulic system can comprise one single piston reciprocating pump, more than one single piston reciprocating pump, one reciprocating piston pump comprising more than one piston, or more than one reciprocating piston pump comprising more than one piston.

In an exemplary configuration, the self-priming hydraulic system comprises a single self-priming pump comprising a pair of reciprocating pistons that are configured in a "double-decker" configuration such that the pair of reciprocating pistons are vertically aligned and coupled to each other via a piston coupling mechanism (e.g. stem). This configuration provides a consolidated footprint to the self-priming pump and circuit. One of the pair of reciprocating pistons, the lower or second piston, directly engages an actuator while the other piston, the upper or first piston, engages the actuator through the lower piston and a couple. Actuation of the lower piston by the actuator results in movement of the upper piston because the couple synchronizes movement of the upper piston and the lower piston. In this configuration, each piston actuates within an independent piston bore, both bores are contained in a single piston housing. It is understood that both bores could also be housed in individual housing.

In another exemplary configuration, the self-priming hydraulic system comprises a pair of self-priming pumps configured in a "side-by-side" configuration, each pump with a single reciprocating piston. The pumps can be either actuated by a single actuator engaged to both pistons through a piston coupling mechanism (e.g. connecting rod) or each pump can be actuated by a separate actuator. In this configuration, each piston is free to move from its BDC position to its TDC position either independently or in unison with the other piston.

In both of the exemplary configurations described above, a circuit is also provided comprising a pair of closed loops, a low pressure loop and a high pressure loop, to circulate non-compressible fluid from one of the pumps to the other.

In this same configuration, a low pressure loop is defined by fluid supports (e.g. conduits) fluidly connecting an outlet of the first piston bore to a resistive element, the resistive element to a low pressure accumulator and the low pressure accumulator to an Inlet of the second piston bore. In this configuration, upon actuation of the first piston from its BDC position to its TDC position, non-compressible fluid is driven out of a first fluid cavity, through a first fluid outlet, through fluid supports to a resistive element, to the low pressure accumulator and subsequently to the second piston cavity through the second piston bore inlet.

In an exemplary closed loop configuration, the high pressure loop is defined by fluid supports fluidly connecting an outlet of the second piston bore to a high pressure accumulator and an inlet of a first piston bore to the high pressure accumulator. In this configuration, upon actuation of the second piston from its BDC position to its TDC position, non-compressible fluid is driven out of a second fluid cavity, through a second fluid outlet, through fluid supports to the high pressure accumulator and subsequently into the first piston bore through the first piston bore inlet.

These exemplary configurations and various embodiments are described in further detail below.

Self-Priming Hydraulic System

In general, a self-priming hydraulic system as described herein comprises at least one reciprocating piston pump integrated into a closed loop system further comprising a high pressure loop and a low pressure loop. The reciprocating piston pump comprises at least one piston, each of the at least one pistons engaged to actuator to drive it to its respective TDC position.

Turning to the Figures, reciprocating hydraulic pump 100 and circuit 102 are described in further detail.

FIG. 1A shows a cross-section view of the main components of one embodiment the self-priming hydraulic system comprising self-priming reciprocating hydraulic pump 100 and circuit 102. In this embodiment, reciprocating hydraulic pump 100 comprises housing 101 within which first piston 104 and a second piston 106 are contained. First piston 104 is received within first piston bore 105 and second piston 106 is received within second piston bore 107.

In this embodiment, first piston 104 and second piston 106 are connected by couple 103 such that movement of second piston 106 along a vertical axis A causes movement of first piston 104. Movement of first piston 104 and second piston 106 is caused by the actuation of actuator 130 which directly engages second piston 106. As can be seen in FIG. 1, an axis A runs lengthwise through first piston 104 and second piston 106. It is recognised that, shown by example in FIG. 1A, both first piston 104 and second piston 106 are concentric about axis A. However, it is recognised that first piston 104 and second piston 106 can be non-concentric about the axis A, as desired. Further, first piston 104 and second piston 106 are axially aligned with axis A.

First piston 104 and second piston 106 can be any contemplated shape provided that the contour of first piston 104 is similar to the contour of first piston bore 105 and the contour of second piston 106 is similar to the contour of second piston bore 107. Other configurations can therefore be utilized while operating in a similar manner as described herein. It is understood that second piston 106 can have a slightly larger cross-sectional area than first piston 104 to compensate for the space lost in second fluid cavity 124 due to the presence of couple 103 that is not present in first fluid cavity 120.

First piston bore 105 co-operates with a top surface 122 of first piston 104 to define a first fluid cavity 120, the first piston bore 105 providing a first fluid inlet 110 and a first fluid outlet 114 disposed on the first piston bore 105 and fluidly coupled to the first fluid cavity 120. A surface 121 of the piston bore 105 (e.g. opposing bore wall to the top surface 122 of the first piston 104) can be variable in position during the operating cycle of the hydraulic pump 100, thus providing for an increase or decrease in bore volume of the first fluid cavity 120 as experienced by the first piston 104 during travel between TDC and BDC. Position of the variable position surface 121 (e.g. a piston also referred to as a floating piston) can be controlled by a resilient element (e.g. compressible fluid) chamber (not shown) positioned behind the variable position surface 121, such that the variable position surface 121 is located between the resilient element chamber (not shown) and the first fluid cavity 120. For example, as volume of the resilient element (e.g. compressed fluid) is decreased in the resilient element chamber (e.g. via ejection of compressible fluid therefrom), the position of the variable position surface 121 will become biased away from the first piston 104 and thus provide for an increased volume of the first fluid cavity 120 experienced by the first piston 104. Alternatively, as volume of the resilient element (e.g. compressed fluid) is increased in the resilient element chamber (e.g. via injection of compressible fluid therein), the position of the variable position surface 121 will become biased towards the first piston 104 and thus provide for a decreased volume of the first fluid cavity 120 experienced by the first piston 104. Control in position of the variable position surface 121 can be provided for (e.g. electronic control of injection/ejection of fluid with respect to the resilient element chamber in response to sensed operating conditions such as pressure, speed, and/or position experienced by the pump pistons, and/or in response to sensed operating conditions such as pressure, speed, and/or position experienced by the motor piston) during travel of the first piston 104 between TDC and BDC while the pump 100 is in operation.

The hydraulic system also has a second piston 106 operable to reciprocate within a second piston bore 107, the second piston bore 107 co-operating with a top surface 126 of the second piston 106 to define a second fluid cavity 124, the second piston bore 107 providing a second fluid inlet 112 and a second fluid outlet 116 disposed on the second piston bore 107 and fluidly coupled to the second fluid cavity 124. Reciprocation of the second piston 106 is coupled to reciprocation of the first piston 104, as herein described by numerous examples, in order to synchronize positioning of the first piston 104 within the first piston bore 105 to positioning of the second piston 106 within the second piston bore 107. For example, the piston coupling mechanism (e.g. couple 103,503 in FIGS. 1A and 5B, respectively) can be used to synchronize travel of the first piston 104 towards BDC within the first fluid cavity 120 at the same time as travel of the second piston 106 towards BDC within the second fluid cavity 124. For example, the piston coupling mechanism (e.g. couple 103,503 in FIGS. 1A and 5B, respectively) can be used to synchronize travel of the first piston 104 towards TDC within the first fluid cavity 120 at the same time as travel of the second piston 106 towards TDC within the second fluid cavity 124. Alternatively, in some configurations as described, the piston coupling mechanism 103 can be used to synchronize travel of the first piston 104 towards TDC within the first fluid cavity 120 at the same time as travel of the second piston 106 towards BDC within the second fluid cavity 124. Alternatively, in some configurations as described, the piston coupling mechanism 103 can be used to synchronize travel of the first piston 104 towards BDC within the first fluid cavity 120 at the same time as travel of the second piston 106 towards TDC within the second fluid cavity 124. It should be understood that first piston 104, second piston 106 and coupling mechanism 103 can be two or more attachable pieces to facilitate assembly.

Figure 1B:
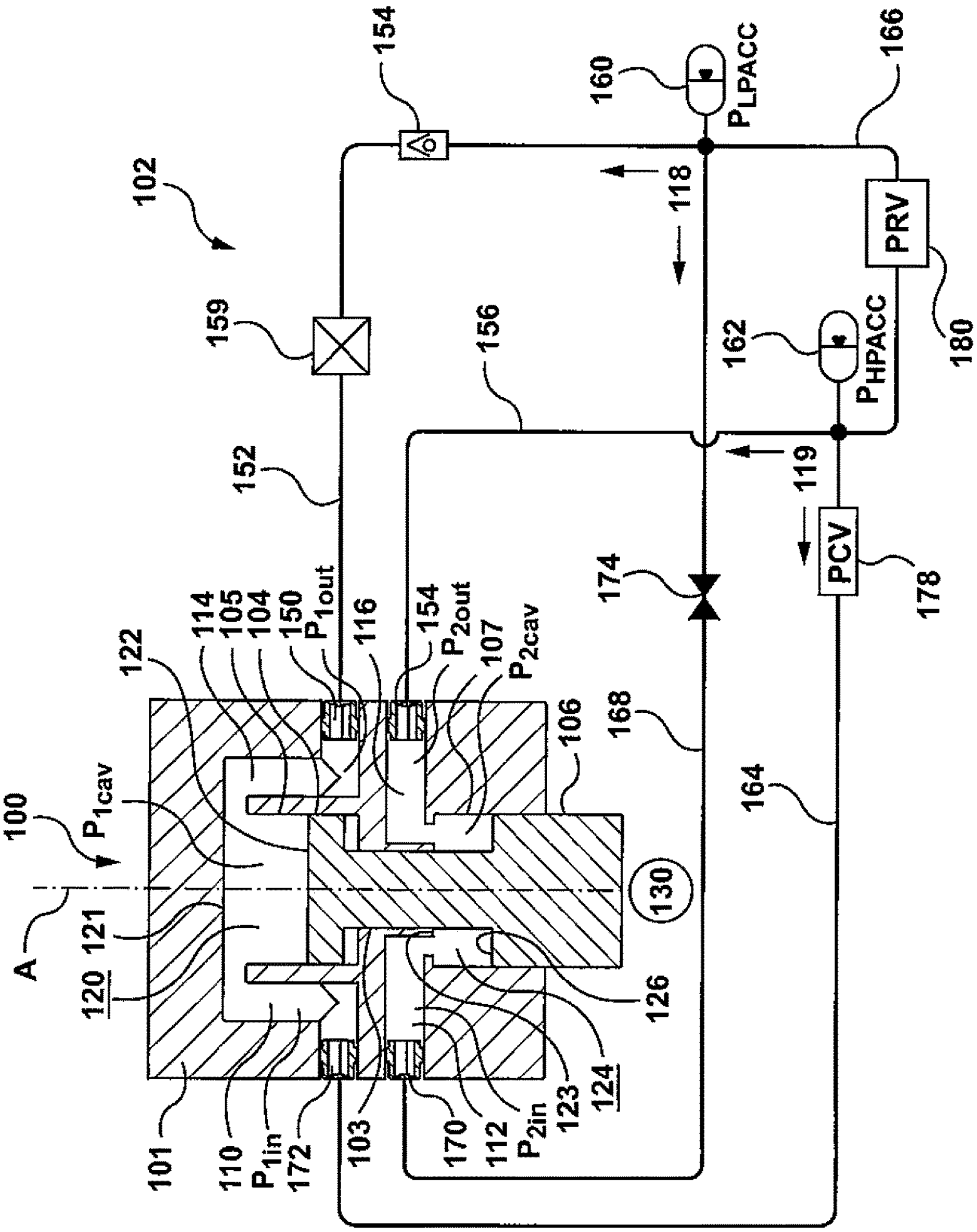

The self-priming hydraulic system described in FIGS. 1A and 1B further comprise a pair of loops to circulate non-compressible fluid: a low pressure loop 118 and a high pressure loop 119. Low pressure loop 118 is defined by a low pressure accumulator 160 fluidly connected to first outlet 114 through a resistive element 159, and fluidly connected to second inlet 112. High pressure loop 119 is defined by high pressure accumulator 162 fluidly connected to second outlet 116 and first inlet 110. It is desirable to have the effluent non-compressible fluid from the resistive element 159 exhaust into the low pressure accumulator 160 to maximize the efficiency of work performed by the resistive element 159.

First fluid cavity 120 is supplied with non-compressible fluid by first inlet 110 when first piston 104 moves to its BDC position. Similarly, second fluid cavity 124 is supplied with non-compressible fluid by second inlet 112 when the second piston 106 moves to its BDC position. Non-compressible fluid exits first fluid cavity 120 through first outlet 114. Non-compressible fluid exits second fluid cavity 124 through second outlet 116.

First inlet 110 contains check valve 172 through which non-compressible fluid passes as it enters first fluid cavity 120. Similarly, first outlet 114 contains check valve 150 through which non-compressible fluid passes as it exits first fluid cavity 120 and enters fluid support 152 of circuit 102. Check valve 172 inhibits flow of non-compressible fluid out of first cavity 120 and back into fluid support 164 from which it entered the self-priming reciprocating hydraulic pump 100. Check valve 150 inhibits flow of non-compressible fluid into first cavity 120 from fluid support 152 after the ejection phase of piston 104. Fluid support 152 delivers non-compressible fluid exiting first fluid cavity 120 to resistive element 159.

Second inlet 112 contains check valve 170 through which non-compressible fluid passes as it enters second fluid cavity 124. Similarly, second outlet 116 contains check valve 154 through which non-compressible fluid passes as it exits second fluid cavity 124 and enters fluid support 156 of circuit 102. Check valve 170 inhibits the flow of non-compressible fluid out of second cavity 124 and back into fluid support 168 from which it entered self-priming reciprocating hydraulic pump 100. Check valve 154 inhibits flow of non-compressible fluid into second cavity 124 from fluid support 156 after the ejection phase of piston 106. Fluid support 156 delivers non-compressible fluid exiting second fluid cavity 124 to high pressure accumulator 162.

Low pressure accumulator 160 is a storage reservoir in which non-compressible hydraulic fluid is held under pressure. High pressure accumulator 162 is also a storage reservoir in which non-compressible hydraulic fluid is held under pressure. In one embodiment, compressed gas is used to maintain desired pressures in low pressure accumulator 160 and high pressure accumulator 162. Typically, low pressure accumulator 160 will store hydraulic fluid at a lower pressure than high pressure accumulator 162. It should be noted that pistons 104 and 106 can be decoupled from actuator 130 at their TDC positions. Low pressure accumulator 160 and high pressure accumulator 162 can provide non-compressible fluid to second fluid cavity 124 and first fluid cavity 120, respectively, to restart the hydraulic system and push piston 104, 106 back towards BDC to re-engage actuator 130.

Gate valve 174 controls injection of non-compressible fluid into second fluid cavity 124. Gate valve 174 can be an on-off valve as flow of non-compressible fluid into second fluid cavity 124 does not need to be closely monitored. Pressure control valve 178 controls infection of non-compressible fluid into first fluid cavity 120. Injection pressure $P_{1in}$ of the non-compressible fluid at first inlet 110 can be influenced by pressure control valve 178. Pressure control valve 178 can be an electronically controlled valve. Pressure reducing valve 180 controls the pressure $P_{HPAcc}$ in high pressure accumulator 162 by controlling the flow of non-compressible fluid from high pressure accumulator 162 to low pressure accumulator 160 through fluid support 166. Pressure reducing valve 180 can be a self-monitoring valve (e.g. spring loaded) such that when pressure $P_{HPAcc}$ becomes higher than the calibrated tolerance of pressure reducing valve 180, non-compressible fluid passes through pressure reducing valve 180 and reduces $P_{HPAcc}$ in high pressure accumulator 162.

It should be understood that in this configuration first fluid cavity 120 ejects non-compressible fluid at $P_{1out}$, which is higher than the pressure $P_{2out}$ at which second fluid cavity 124 ejects non-compressible fluid. This is because in some embodiments described below non-compressible fluid ejected from first fluid cavity 120 will enter resistive element 159 and is used to perform work. It is desirable to have effluent non-compressible fluid from resistive element 159 exhaust into low pressure accumulator 160 at $P_{LPAcc}$ to maximize the pressure difference between the inlet and outlet of resistive element 159.

Fluid support 152 delivers non-compressible fluid from first outlet 114 to resistive element 159. Resistive element 159 uses non-compressible fluid provided from first fluid cavity 120 at $P_{1out}$ to perform work. Fluid support 155 delivers effluent non-compressible fluid from resistive element 159 to low pressure accumulator 160. Fluid support 155 can contain check valve 154 between resistive element 159 and low pressure accumulator 160.

Low pressure accumulator 160 of low pressure loop 118 stores returning volumes of non-compressible hydraulic fluid that exits resistive element 159 at pressure $P_{LAcc}$. It should be understood that low pressure accumulator 160 can be charged with a compressed gaseous fluid such as air or nitrogen. Low pressure accumulator 160 addresses thermal expansion of the non-compressible fluid as it exits resistive element 159. Non-compressible fluid exiting resistive element 159 increases in temperature. By entering low pressure accumulator 160 after exiting resistive element 159, non-compressible fluid can rest in the low pressure accumulator 160 before entering second fluid cavity 124 of reciprocating hydraulic pump 100 at second inlet 112.

Fluid support 156 delivers non-compressible fluid from second outlet 116 to high pressure accumulator 162 of high pressure loop 119.

High pressure accumulator 162 is used to store returning volumes of non-compressible fluid that exits second cavity 124 at $P_{2out}$. High pressure accumulator 162 can also be charged with a gaseous fluid such as air or nitrogen. Maintaining pressure $P_{HAcc}$ within high pressure accumulator 162 allows the closed loop system to inject non-compressible fluid into first fluid cavity 120 at a high pressure.

Fluid support 168 delivers non-compressible fluid from low pressure accumulator 160 to second inlet 112 through check valve 170. Fluid support 168 can contain gate valve 174. Fluid support 164 delivers non-compressible fluid from high pressure accumulator 162 to first inlet 110 through check valve 172. Fluid support 164 can contain pressure control valve 178 to control the pressure of non-compressible fluid first inlet 110.

Fluid support 166 provides a relief to high pressure accumulator 162 by delivering non-compressible fluid from the high pressure accumulator 162 to the low pressure accumulator 160. Pressure release valve 180 controls the flow of non-compressible fluid from high pressure accumulator 162 to low pressure accumulator 160 and therefore can be used to control pressure $P_{HAcc}$ in high pressure accumulator 162.

FIG. 1B shows a cross-section of the same system as was described in FIG. 1A, however, first piston 104 and second piston 106 are at their respective BDC positions. This configuration marks the beginning of the ejection phase of reciprocating hydraulic pump 100, which is described in greater detail below.

Figure 2A:
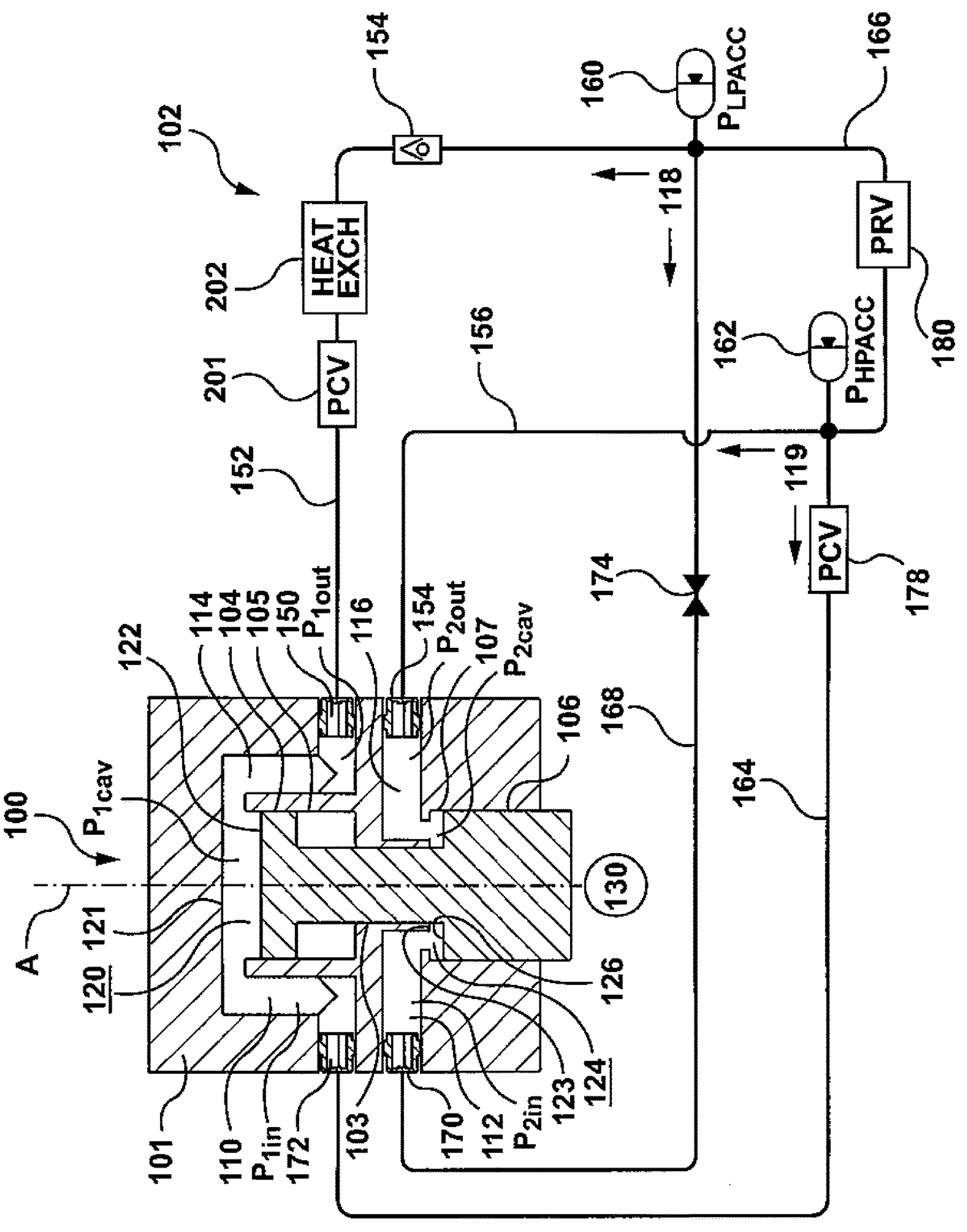
FIGS. 2A and 2B show a cross-section view of an alternate double-decker embodiment of a self-priming pump and circuit where a first piston and a second piston are shown at their TDC and BDC positions and the circuit includes a heat exchanger.

FIG. 2A shows the same system as described in FIGS. 1A and 1B, however, resistive element 159 is shown as pressure control valve 201. Pressure control valve 201 is used to choke the flow of non-compressible fluid out of first fluid cavity 120 via first outlet 114 to enable the non-compressible fluid to perform work. Pressure control valve 201 is followed by heat exchanger 202 to collect heat from the non-compressible fluid exiting pressure control valve 201. In this embodiment, work is generated and the temperature of the non-compressible fluid rises as a result. Pressure control valve 201 and heat exchanger 202 can be provided anywhere within low pressure loop 118 provided that non-compressible fluid exiting first fluid cavity 120 passes through pressure control valve 201 and heat exchanger 202, respectively, before entering low pressure accumulator 160. Low pressure accumulator 160 of low pressure loop 118 is provided downstream from both pressure control valve 201 and heat exchanger 202. As previously described, placing a resistive element such as pressure control valve 201 in the effluent from first fluid cavity 120 before low pressure accumulator 160 allows the non-compressible fluid from pressure control valve 201 to exhaust into low pressure accumulator 160. This configuration produces a large pressure difference between the inlet and outlet of pressure control valve 201 and maximizes the efficiency of work performed by pressure control valve 201.

Figure 2B:
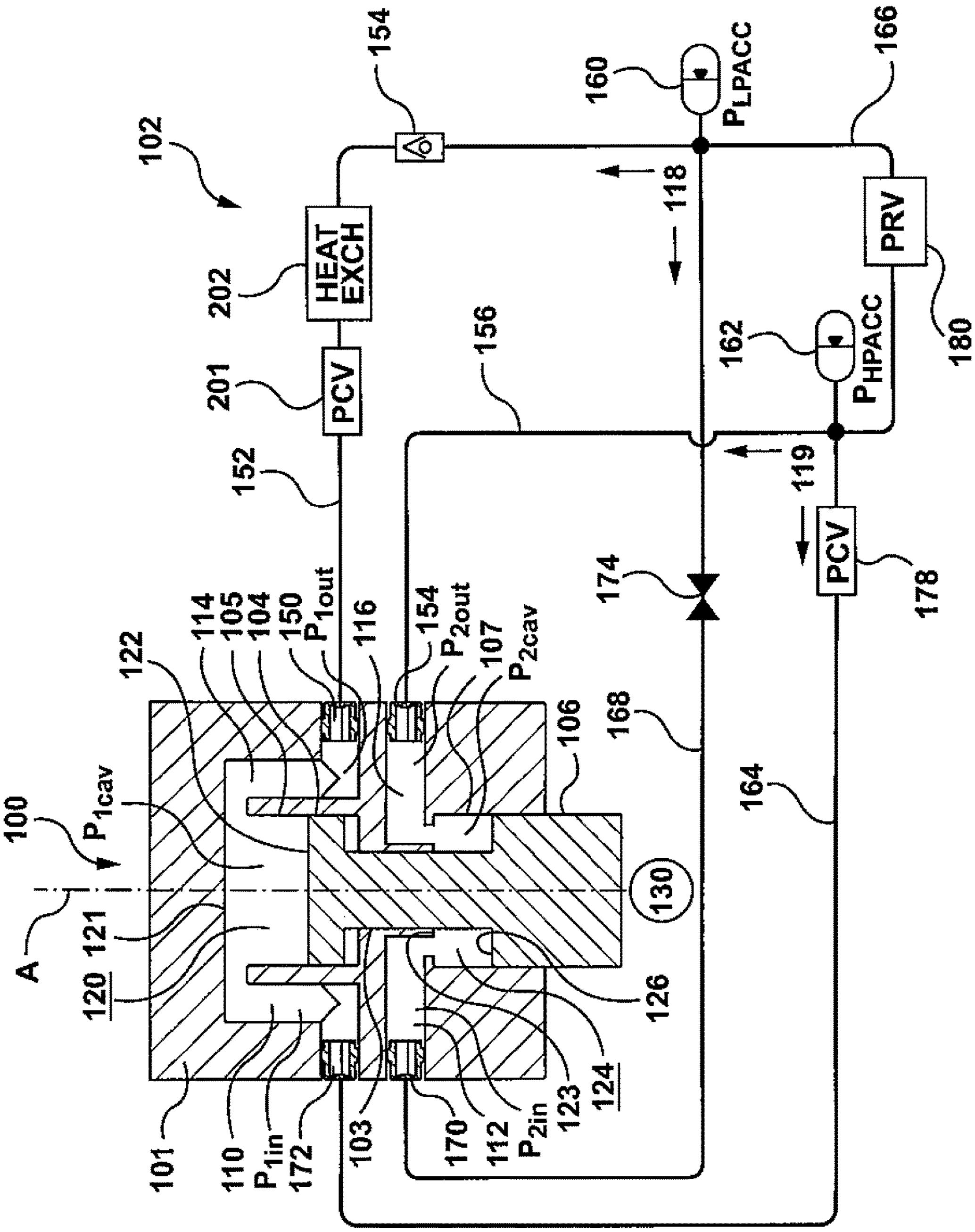

FIG. 2B shows a cross-section of the system as described above in FIG. 2A, however, first piston 104 and second piston 106 are at their respective BDC positions.

Figure 3A:
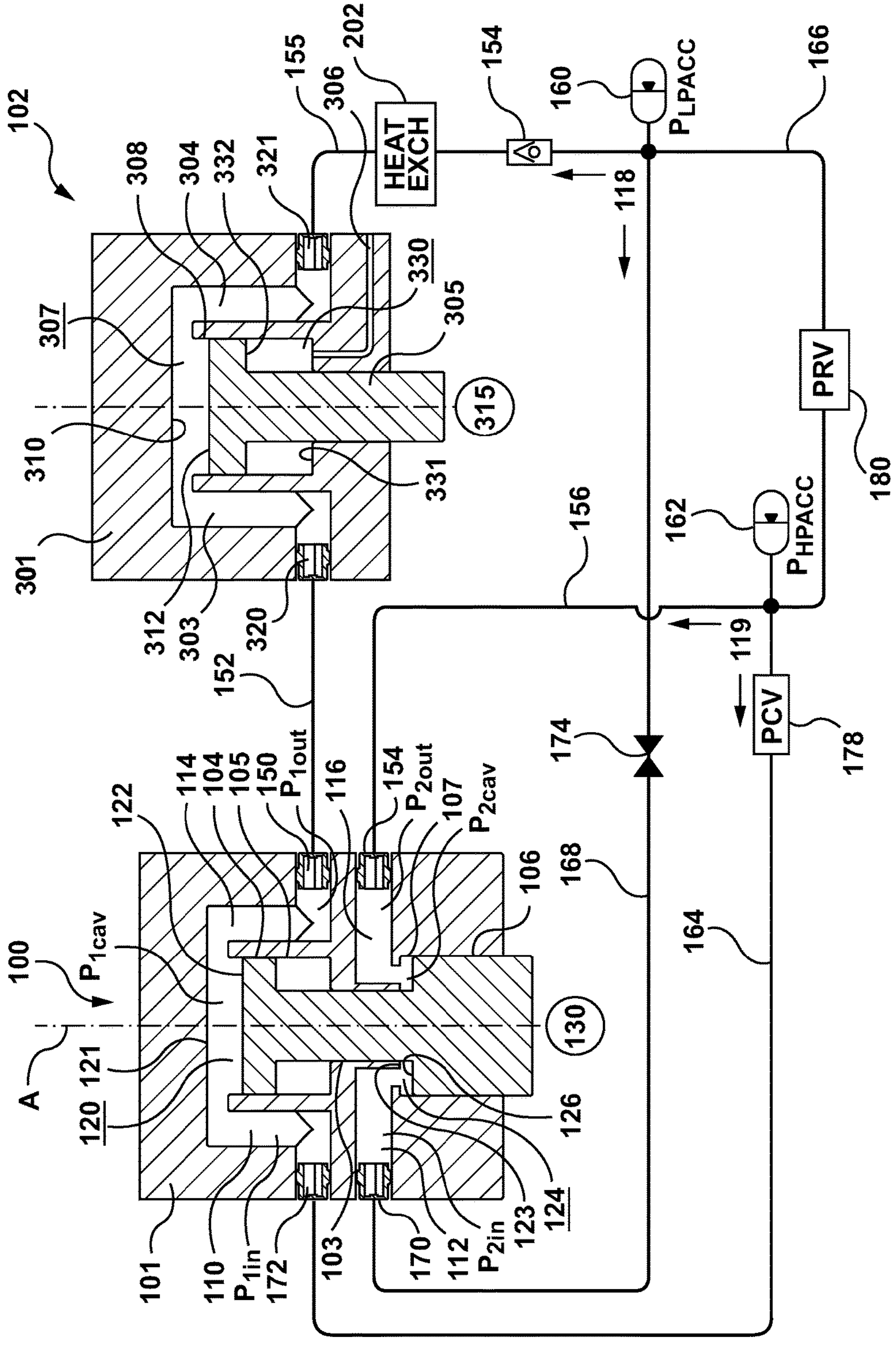
FIGS. 3A and 3B show a cross-section view of an alternate double-decker embodiment of a self-priming pump and circuit where a first piston and a second piston are shown at TDC and BDC positions and the circuit includes a heat exchanger and a motor.
Figure 3B:
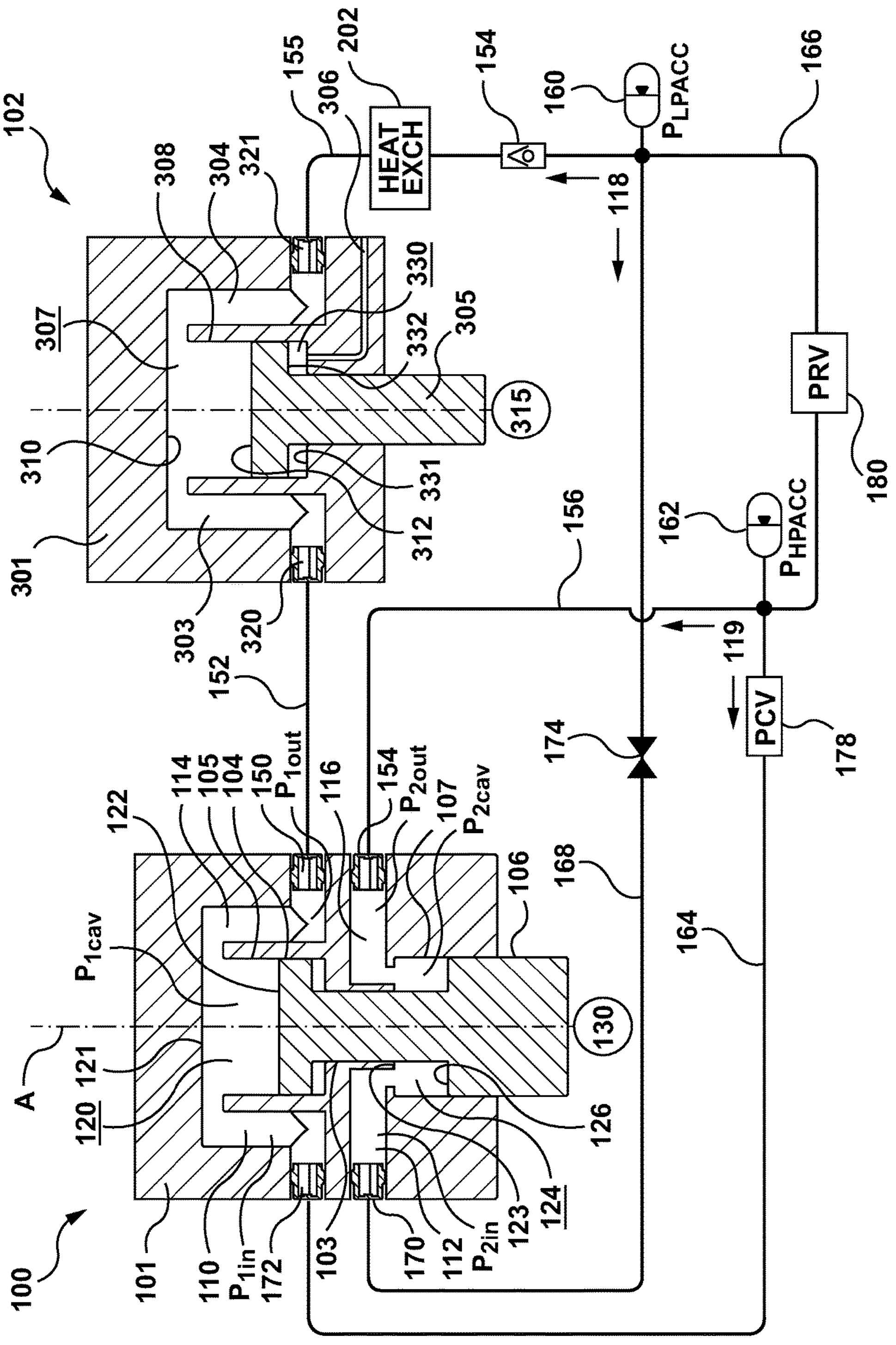

FIG. 3A shows the same system as described in FIGS. 2A and 2B with resistive element 159 of FIGS. 1A and 1B as a hydraulic motor 301 (e.g. reciprocating). Motor 301 is able to perform work using non-compressible fluid ejected from first fluid cavity 120. It should be understood that motor 301 illustrated in FIGS. 3A and 3B is a single reciprocating piston motor, however, any motor configuration, including more complex motor configurations, can be used as a fluid resistive element. In one non-limiting example, motor 301 can be a double-acting piston motor.

Motor 301 comprises a motor inlet 303 and a motor outlet 304 fluidly connected to a motor fluid cavity 307 defined by opposite surfaces of motor bore 308, a top surface 312 of motor piston 305 and a top surface 310 of motor bore 307 opposed to top surface 312 of motor piston 305. It should be understood that top surface 310 of motor bore 307 can be a rigid surface of bore 307 or a movable surface of another structure within bore 307, with structure and function as previously described for surface 121 of piston 104. Motor piston 305 is coupled to load 315 to drive motor piston to TDC upon being driven to BDC by the non-compressible fluid from first fluid cavity 120. Upon movement to its TDC position, non-compressible fluid is driven out of motor fluid cavity 307 through motor outlet 304. Motor inlet 303 can comprise motor check valve 320 and motor outlet 304 can comprise flow control valve 321. Check valve 320 can also be an electronic solenoid valve. During an injection phase of motor 301, flow control valve 320 is open and flow control valve 321 is closed. During an ejection phase, flow control valve 320 is closed and flow control valve 321 is open.

Motor 301 can comprise capillary tube 306 to facilitate passage of a compressible fluid in and out of lower cavity 330 of motor bore 308, where lower cavity 330 is defined by opposite and adjacent sides of motor bore 308, an underside surface 332 of motor piston 305 and a lower surface of motor bore 331.

As previously described, to facilitate efficiency of motor 301, a large pressure change (e.g. Delta, Δ) is desired between the pressure $P_{1_{out}}$ of non-compressible fluid and low pressure accumulator 160. As shown in FIG. 3A, motor 301 is fluidly connected to heat exchanger 202. It should be recognized that when motor 301 is present as a resistive element, the heat exchanger 202 in loop 118 is an optional component and motor 301 can also be directly fluidly connected to low pressure accumulator 160 of low pressure loop 118 through fluid support 155.

FIG. 3B shows the same system as described in FIG. 3A, however, first piston 104 and second piston 106 are at their respective BDC positions.

Figure 4A:
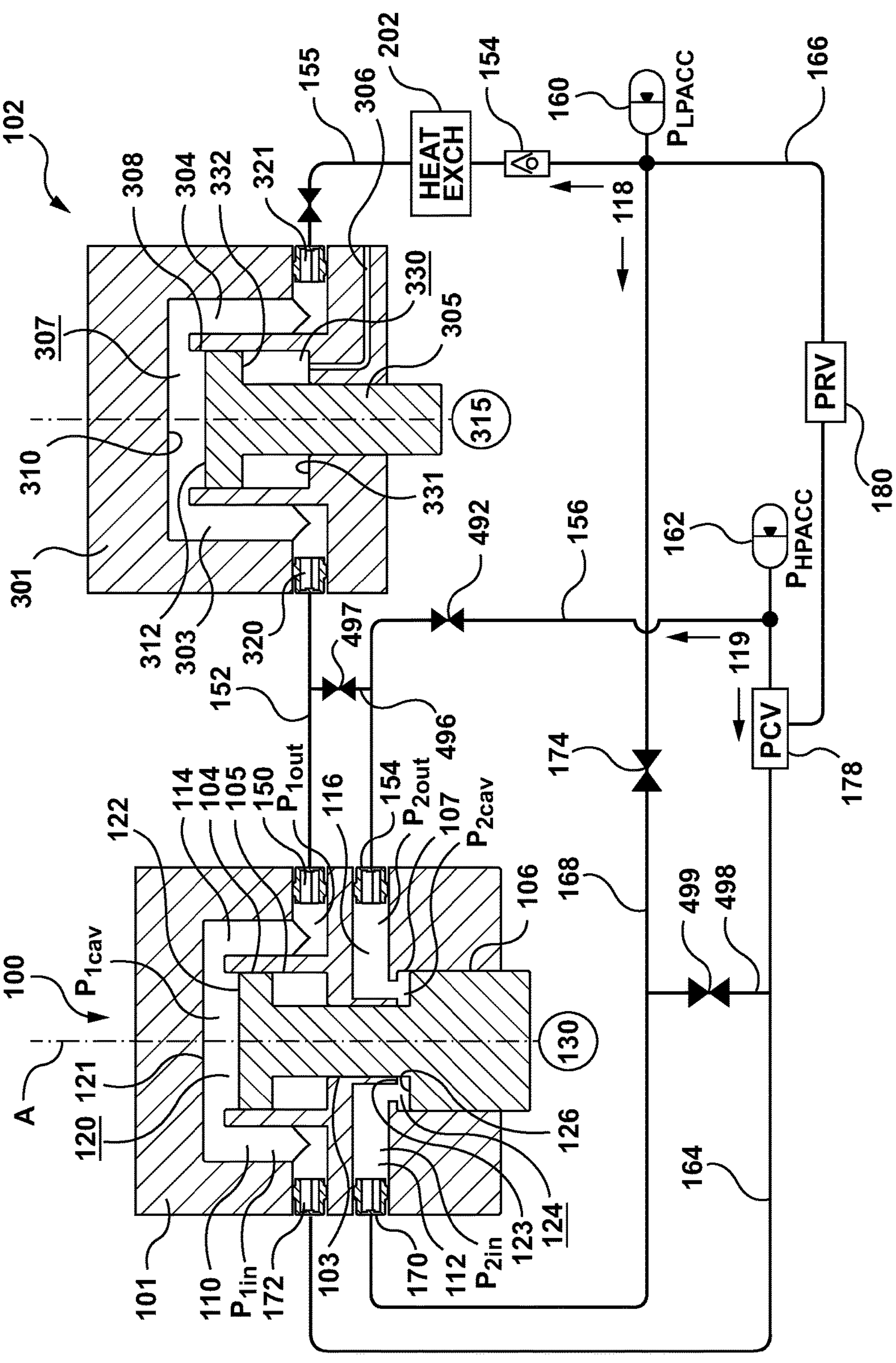
FIGS. 4A and 4B show a cross-section view of an alternate double-decker embodiment of a self-priming pump and circuit where a first piston and a second piston are shown at TDC and BDC and the circuit includes a motor, a heat exchanger, a control valve in the effluent stream from the high pressure accumulator, a first fluid support fluidly couples the high pressure loop to the low pressure loop upstream of the resistive element to direct non-compressible fluid from the high pressure loop to the low pressure loop, and a second fluid support fluidly couples the low pressure loop downstream of the resistive element to the high pressure loop to direct non-compressible fluid from the low pressure loop to the high pressure loop.

FIG. 4A shows the same system as described in FIGS. 3A and 3B, with pressure control valve 178 shown as a three-way control valve 478 to control a volume of non-compressible fluid entering first fluid cavity 120 from high pressure accumulator 162 and the volume of non-compressible fluid by-passed to the low pressure accumulator 160 from high pressure accumulator 162 via fluid support 166.

FIG. 4A also shows fluid support 496 comprising valve 497 (e.g gate), fluid support 498 comprising valve 499 (e.g. gate), and valve 492 (e.g. gate). Valves 492 and 497 can be used in combination to facilitate directing non-compressible fluid ejected from second fluid cavity 124 to join non-compressible fluid ejected from first fluid cavity 120 towards resistive element 159. Resistive element 159 is shown as motor 301 in FIGS. 4A and 4B. Valve 499 facilitates directing a portion of non-compressible fluid ejected from motor 301 to high pressure loop 119.

Fluid support 496 is upstream of motor 301 and can optionally be upstream of high pressure accumulator 162. The term upstream can be defined as direction of fluid flow experienced by (i.e. away from) a position on a flow pathway (i.e. loop or fluid support) relative to the direction experienced by (i.e. towards) another position on the same flow pathway (i.e. loop or fluid support). For example, a location A of a flow pathway (e.g. high pressure loop 119 or low pressure loop 118) is considered upstream of a relative location B of the same flow pathway if, at location A, fluid is flowing away from location A and towards location B. For example, in FIG. 4A non-compressible fluid enters low pressure loop 118 from fluid support 496 and flows from fluid support 496 towards motor 301. Therefore, fluid support 496 is upstream of motor 301.

Valve 492 is downstream of fluid support 496. The term downstream can be defined as direction of fluid flow experienced by (i.e. towards) a position on a flow pathway (i.e. loop or fluid support) relative to the direction experienced by (i.e. away from) another position on the same flow pathway (i.e. loop or fluid support). For example, a location A of a flow pathway (e.g. high pressure loop 119 or low pressure loop 118) is considered downstream of a relative location B of the same flow pathway if, at location A, fluid is flowing towards location A from location B. For example, in FIG. 4A, when non-compressible fluid flows through valve 492 fluid is flowing towards valve 492 from fluid support 496. Therefore, valve 492 is downstream of fluid support 496.

In FIG. 4A, fluid support 496 is shown as being fluidly coupled to fluid supports 152 and 156 adjacent to first fluid outlet 114 and second fluid outlet 116. Although shown as two independent valves in FIG. 4A, valves 492 and 497 can be combined into a single three-way valve (not shown).

Fluid support 498 is downstream of motor 301. Fluid support 498 can be upstream or downstream of high pressure accumulator 162. Fluid support 498 is shown in FIG. 4A as being fluidly coupled to fluid support 164 and 168 adjacent to first fluid inlet 110 and second fluid inlet 112. When fluid support 498 is located as shown in FIG. 4A, non-compressible fluid ejected from second fluid cavity 124 into high pressure loop 119 temporarily bypasses high pressure accumulator 162. When valves 492 and 497 are used to join non-compressible fluid ejected from first and second fluid cavities 120,124, respectively, valve 499 can be used downstream of motor 301 in combination with valves 492 and 497, which are upstream of motor 301, to direct a portion of non-compressible fluid ejected from motor 301 back into high pressure loop 199 upstream of first fluid inlet 110. It can be desirable to direct non-compressible fluid into high pressure loop 119 upstream of first fluid inlet 110 to inhibit first fluid cavity 120 from developing a vacuum, which could occur if an insufficient volume of non-compressible fluid was present during a downstroke of first piston 104.

Figure 4B:
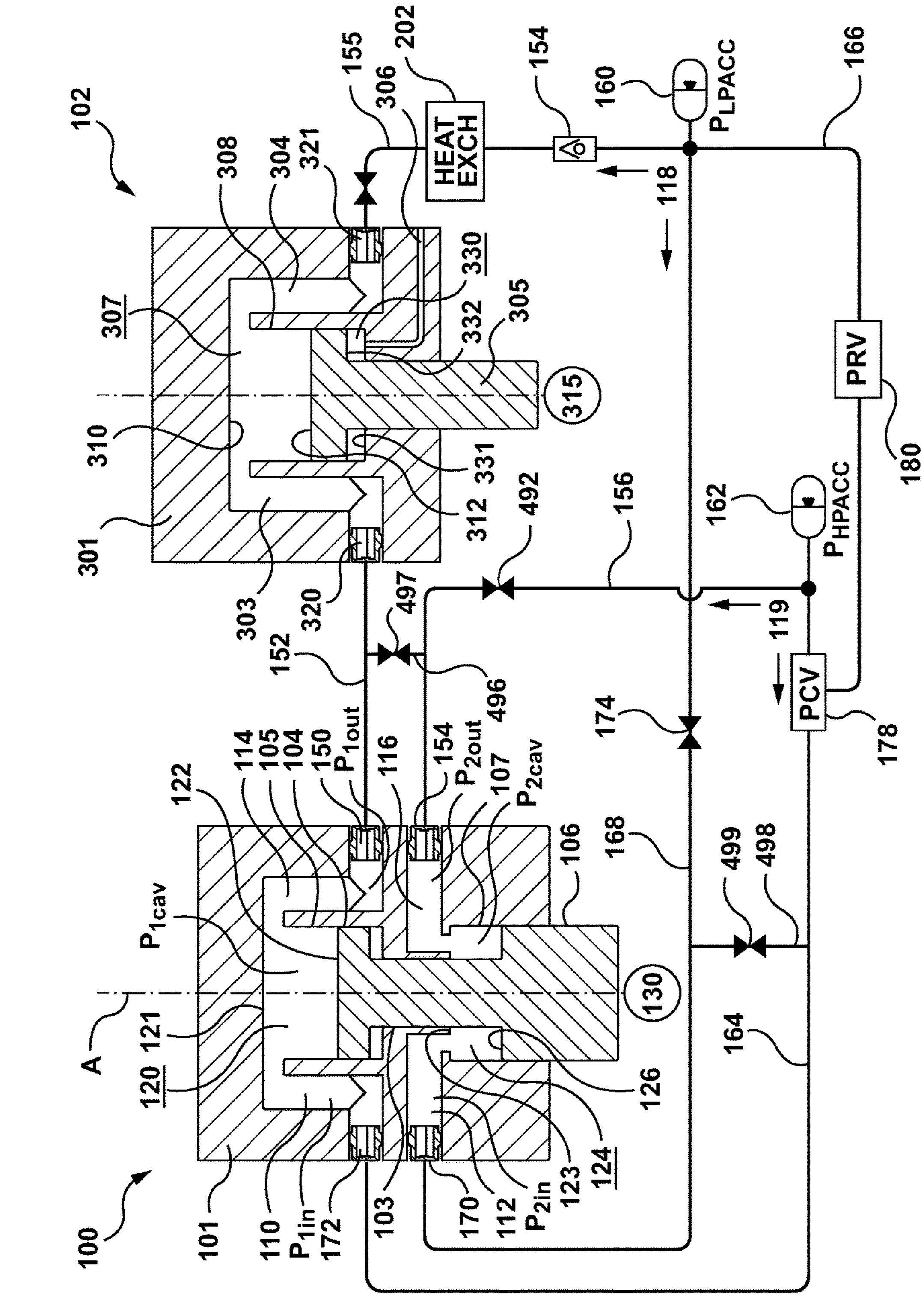
Figure 5A:
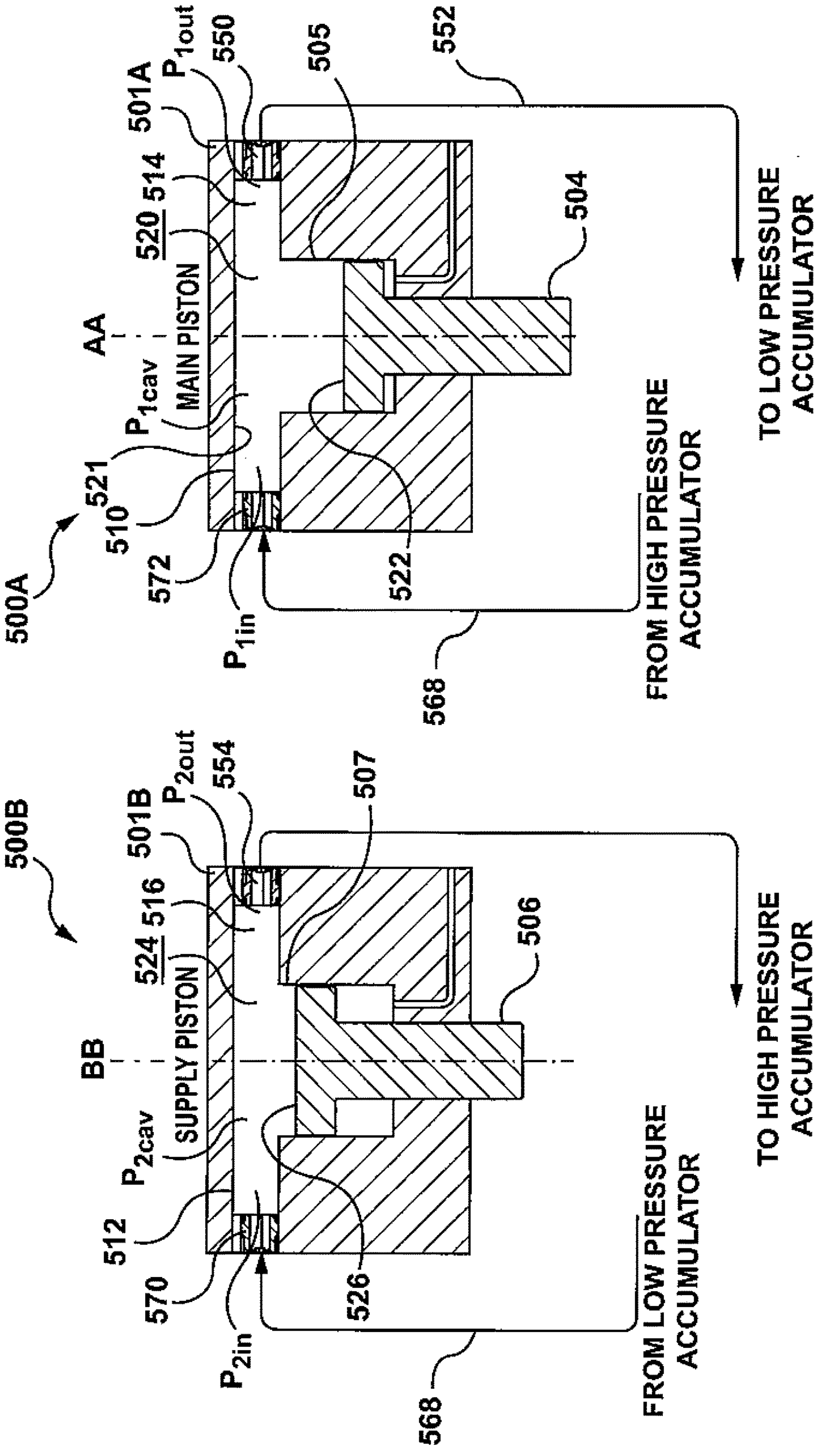
FIG. 5A shows a cross-section view of a side-by-side embodiment of a pair of self-priming pumps where a first piston is shown at its TDC position and a second piston is shown at its BDC position.
Figure 5B:
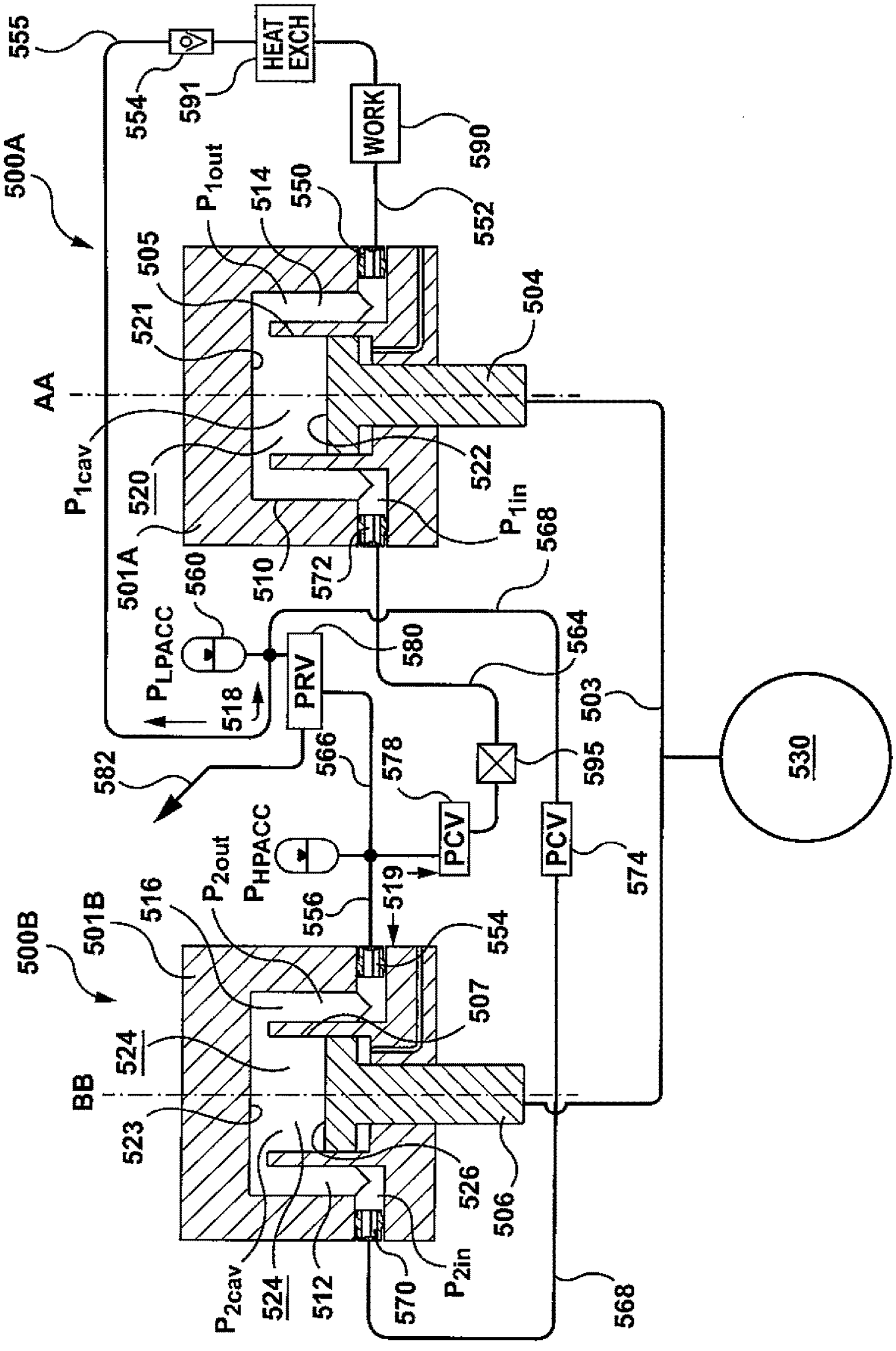
FIG. 5B shows a cross-section view of a side-by-side embodiment of a pair of self-priming pumps and a circuit where a first piston and a second piston are shown at their BDC positions and the circuit includes a fluid resistive element and a heat exchanger.

It should be noted that although fluid supports 496 and 498 and valves 492, 497 and 499 are shown in the configuration shown in FIGS. 4A and 4B, these components can be included as described in any of the variations and embodiments discussed herein including but not limited to the side-by-side configuration shown in FIGS. 5A and 5B.

FIG. 4B shows the same system as described in FIG. 4A, however, first piston 104, second piston 106 and motor piston 305 are at their respective BDC positions.

FIGS. 5A and 5B show a cross-section view of a second embodiment of a self-priming hydraulic system. FIG. 5A illustrates a pair of reciprocating piston pumps in a side-by-side configuration and the connectability of their respective inlet and outlet fluid supports. Figure SB shows the entire side-by-side configuration of a self-priming hydraulic system comprising two reciprocating piston pumps in a side-by-side configuration.

In this embodiment, pumps 500A and 500B comprise first housing 501A and second housing 501B, respectively. First piston 504 is contained in first housing 501A and second piston 506 is contained in second housing 501B. First piston 504 is received within first piston bore 505 and second piston 506 is received within second piston bore 507.

In this embodiment as shown, first piston 504 and second piston 506 both engage actuator 530 through couple 503 (e.g. a cam shaft). It should be understood that first piston 504 and second piston 506 can also directly engage actuator 530 directly without couple 503 or can each engage separate actuators 530 and 530B (not shown).

In the embodiment shown in FIG. 5B, movement of first piston 504 and second piston 506 along axes AA and BB towards their respective TDC positions, respectively, is caused by the actuation of actuator 530. Actuation of actuator 530 can transmit motion through couple 503 to both first piston 504 and second piston 506 such that movement of first piston 504 and second piston 506 towards their respective TDC positions is reasonably synchronized. Movement of first piston 504 and second piston 506 towards their respective TDC and BDC positions can also be opposite each other, such that as first piston 504 moves towards TDC, second piston 506 moves towards BDC and vice versa by offsetting the reciprocation of one of pistons 504, 506 by 180 degrees.

It is recognised that, shown by example in FIGS. 5A and 5B, both first piston 504 and second piston 506 are concentric about an axes AA and BB, respectively, running through first piston 504 and second piston 506. However, it is recognised that first piston 504 and second piston 506 can be non-concentric about the axes AA and BB as desired. First piston 504 and second piston 506 can be any contemplated shape provided that the contour of first piston 504 is similar to the contour of first piston bore 505 and the contour of second piston 506 is similar to the contour of second piston bore 507. Other configurations can therefore be utilized while operating in a similar manner as described herein. It is understood that in this embodiment second piston 506 and first piston 504 will have the same size and shape.

First piston bore 505 co-operates with a top surface 522 of first piston 504 to define a first fluid cavity 520, the first piston bore 505 providing a first fluid inlet 510 and a first fluid outlet 514 disposed on the first piston bore 505 and fluidly coupled to the first fluid cavity 520. A surface 521 of the piston bore 505 (e.g. opposing bore wall to the top surface of the first piston) can be variable in position during the operating cycle of the hydraulic pump 500A, thus providing for an increase or decrease in bore volume of the first fluid cavity 520 as experienced by the first piston 504 during travel between TDC and BDC. Position of the variable position surface 521 (e.g. a piston also referred to as a floating piston) can be controlled by a resilient element (e.g. compressible fluid) chamber (not shown) positioned behind the variable position surface 521, such that the variable position surface 521 is located between the resilient element chamber (not shown) and the first fluid cavity 520. For example, as volume of the resilient element (e.g. compressed fluid) is decreased in the resilient element chamber (e.g. via ejection of compressible fluid therefrom), the position of the variable position surface 521 will become biased away from the first piston 504 and thus provide for an increased volume of the first fluid cavity 520 experienced by the first piston 504. Alternatively, as volume of the resilient element (e.g. compressed fluid) is increased in the resilient element chamber (e.g. via injection of compressible fluid therein), the position of the variable position surface 521 will become biased towards the first piston 504 and thus provide for a decreased volume of the first fluid cavity 520 experienced by the first piston 504. Control in position of the variable position surface 521 can be provided for (e.g. electronic control of injection/ejection of fluid with respect to the resilient element chamber in response to sensed operating conditions such as pressure, speed, and/or position experienced by the pump pistons, and/or in response to sensed operating conditions such as pressure, speed, and/or position experienced by the motor piston) during travel of the first piston 504 between TDC and BDC while the pump 500A is in operation.

The hydraulic system also has a second piston 506 operable to reciprocate within a second piston bore 507, the second piston bore 507 co-operating with a top surface 528 of the second piston 506 to define a second fluid cavity 524, the second piston bore 507 providing a second fluid inlet 512 and a second fluid outlet 516 disposed on the second piston bore 507 and fluidly coupled to the second fluid cavity 524. Reciprocation of the second piston 506 is coupled to reciprocation of the first piston 504, as herein described by numerous examples, in order to synchronize positioning of the first piston 504 within the first piston bore 505 to positioning of the second piston 506 within the second piston bore 507. For example, the piston coupling mechanism can be used to synchronize travel of the first piston 504 towards BDC within the first fluid cavity 520 at the same time as travel of the second piston 506 towards BDC within the second fluid cavity 524. For example, the piston coupling mechanism 503 can be used to synchronize travel of the first piston 504 towards TDC within the first fluid cavity 520 at the same time as travel of the second piston 506 towards TDC within the second fluid cavity 524. Alternatively, in some configurations as described, the piston coupling mechanism 503 can be used to synchronize travel of the first piston 504 towards TDC within the first fluid cavity 520 at the same time as travel of the second piston 506 towards BDC within the second fluid cavity 524. Alternatively, in some configurations as described, the piston coupling mechanism 503 can be used to synchronize travel of the first piston 504 towards BDC within the first fluid cavity 520 at the same time as travel of the second piston 506 towards TDC within the second fluid cavity 524.

The self-priming hydraulic system described in FIGS. 5A and 5B further comprise a pair of loops to circulate non-compressible fluid: a low pressure loop 518 and a high pressure loop 519. Low pressure loop 518 is defined by a low pressure accumulator 560 fluidly connected to first outlet 514 through a resistive element 590, and fluidly connected to second inlet 512. High pressure loop 519 is defined by high pressure accumulator 582 fluidly connected to second outlet 516 and first inlet 510. It is desirable to have the effluent non-compressible fluid from the resistive element 590 exhaust into the low pressure accumulator 560 to maximize the efficiency of work performed by the resistive element 590.

Low pressure accumulator 560 is a storage reservoir in which non-compressible hydraulic fluid is held under pressure. High pressure accumulator 562 is also a storage reservoir in which non-compressible hydraulic fluid is held under pressure. In one embodiment, compressed gas is used to maintain desired pressures in low pressure accumulator 560 and high pressure accumulator 562. Typically, low pressure accumulator 560 will store hydraulic fluid at a lower pressure than high pressure accumulator 562. It should be noted that pistons 504 and 506 can be decoupled from actuator 530 at their TDC positions. Low pressure accumulator 560 and high pressure accumulator 562 can provide non-compressible fluid to second fluid cavity 524 and first fluid cavity 520, respectively, to restart the hydraulic system and push pistons 504, 506 back towards BDC to re-engage actuator 530.

First fluid cavity 520 is supplied with non-compressible fluid by first inlet 510 when first piston 504 moves to its BDC position. Similarly, second fluid cavity 524 is supplied with non-compressible fluid by second inlet 512 when the second piston 506 moves to its BDC position. Non-compressible fluid exits first fluid cavity 520 through first outlet 514. Non-compressible fluid exits second fluid cavity 524 through second outlet 516.

First inlet 510 contains check valve 572 through which non-compressible fluid passes as it enters first fluid cavity 520. First outlet 514 contains check valve 550 through with non-compressible fluid passes as it exits first fluid cavity 520 and enters fluid support 552 of low pressure loop 518. Check valve 572 inhibits flow of non-compressible fluid out of first cavity 520 and back into fluid support 564 from which it entered self-priming pump 500A. Check valve 550 inhibits flow of non-compressible fluid into first fluid cavity 520 from fluid support 552 after the ejection phase of piston 504. Fluid support 552 delivers non-compressible fluid exiting first fluid cavity 520 to resistive element 590.

Second inlet 512 contains check valve 570 through with non-compressible fluid passes as it enters second fluid cavity 524. Similarly, second outlet 516 contains check valve 554 through which non-compressible fluid passes as it exits second fluid cavity 524 and enters fluid support 556 of high pressure loop 519. Check valve 570 inhibits the flow of non-compressible fluid out of second cavity 524 and back into fluid support 568 from which it entered self-priming pump 500B. Fluid support 556 delivers non-compressible fluid exiting second fluid cavity 524 to high pressure accumulator 562.

Pressure control valve 574 controls injection of non-compressible fluid into second fluid cavity 524. Pressure control valve 574 can also be an on-off valve. Pressure control valve 578 controls infection of non-compressible fluid into first fluid cavity 520. Injection pressure $P_{1_{in}}$ of the non-compressible fluid at first inlet 510 can be influenced by pressure control valve 578. Pressure-control valve 578 can be an electronically controlled valve. Pressure reducing valve 580 controls the pressure $P_{HPAcc}$ in high pressure accumulator 582 by controlling the flow of non-compressible fluid from high pressure accumulator 562 to low pressure accumulator 560 through fluid support 566. Pressure reducing valve 580 can be a self-monitoring valve (e.g. spring loaded) such that when pressure $P_{HPAcc}$ becomes higher than a calibrated tolerance of pressure reducing valve 580, non-compressible fluid passes through pressure reducing valve 580 and reduces $P_{HPAcc}$ in high pressure accumulator 562. Non-compressible fluid from high pressure accumulator 562 can enter low pressure accumulator 580 through pressure reducing valve 580. Pressure reducing valve 580 can also direct non-compressible fluid from either low pressure accumulator 560 or high pressure accumulator 562 to another accumulator vessel (not shown) through fluid support 582.

It should be understood that in this configuration first fluid cavity 520 ejects non-compressible fluid at $P_{1_{out}}$, which is higher than the pressure $P_{2_{out}}$ at which second fluid cavity 524 ejects non-compressible fluid. This is because in some embodiments non-compressible fluid ejected from first fluid cavity 520 will enter resistive element 590 and used to perform work. It is desirable to have effluent non-compressible fluid from resistive element 590 exhaust into low pressure accumulator 560 (via heat exchanger 591) at $P_{LPAcc}$ to maximize the pressure difference between the Inlet and outlet of resistive element 590.

Fluid support 552 delivers non-compressible fluid from first outlet 514 to resistive element 590. Resistive element 590 uses non-compressible fluid provided from first fluid cavity 520 at $P_{1_{out}}$ to perform work. Fluid support 555 delivers effluent non-compressible fluid from resistive element 590 to low pressure accumulator 560 (via heat exchanger 591). Fluid support 555 can contain check valve 554 between heat exchanger 591 and low pressure accumulator 560.

Low pressure accumulator 560 of low pressure loop 518 stores returning volumes of non-compressible hydraulic fluid that exit resistive element 590. Low pressure accumulator 560 has a pressure $P_{LAcc}$. It should be understood that low pressure accumulator 560 can be charged with a compressed gaseous fluid such as air or nitrogen. Low pressure accumulator 560 addresses thermal expansion of the non-compressible fluid as it exits resistive element 590. Non-compressible fluid exiting resistive element 590 increases in temperature and volume. Low pressure accumulator 560 is therefore provided after resistive element 590 to offer space for this additional volume of non-compressible fluid before re-entering second fluid cavity 524 of reciprocating hydraulic pump 500B at second inlet 512.

Fluid support 556 delivers non-compressible fluid from second outlet 516 to high pressure accumulator 562 of high pressure loop 519.

High pressure accumulator 562 is used to store returning volumes of non-compressible fluid that exits second cavity 524 at $P_{2_{out}}$. High pressure accumulator 562 can also be charged with a gaseous fluid such as air or nitrogen. Maintaining pressure $P_{HAcc}$ within high pressure accumulator 562 allows the closed loop system to inject non-compressible fluid into first fluid cavity 520 at a high pressure.

Fluid support 568 delivers non-compressible fluid from low pressure accumulator 560 to second inlet 512 through check valve 570. Fluid support 568 can contain pressure control valve 574. Fluid support 564 delivers non-compressible fluid from high pressure accumulator 562 to first inlet 510 through check valve 572. Fluid support 564 can contain pressure control valve 578 to control the pressure of non-compressible fluid leaving high pressure accumulator 562 and entering first inlet 510.

Fluid support 566 provides a relief to high pressure accumulator 562 by delivering non-compressible fluid from the high pressure accumulator 562 to the low pressure accumulator 560. Pressure reducing valve 580 controls the flow of non-compressible fluid from high pressure accumulator 562 to low pressure accumulator 560 and therefore can be used to control pressure $P_{HAcc}$ in high pressure accumulator 562.

Figure 6:
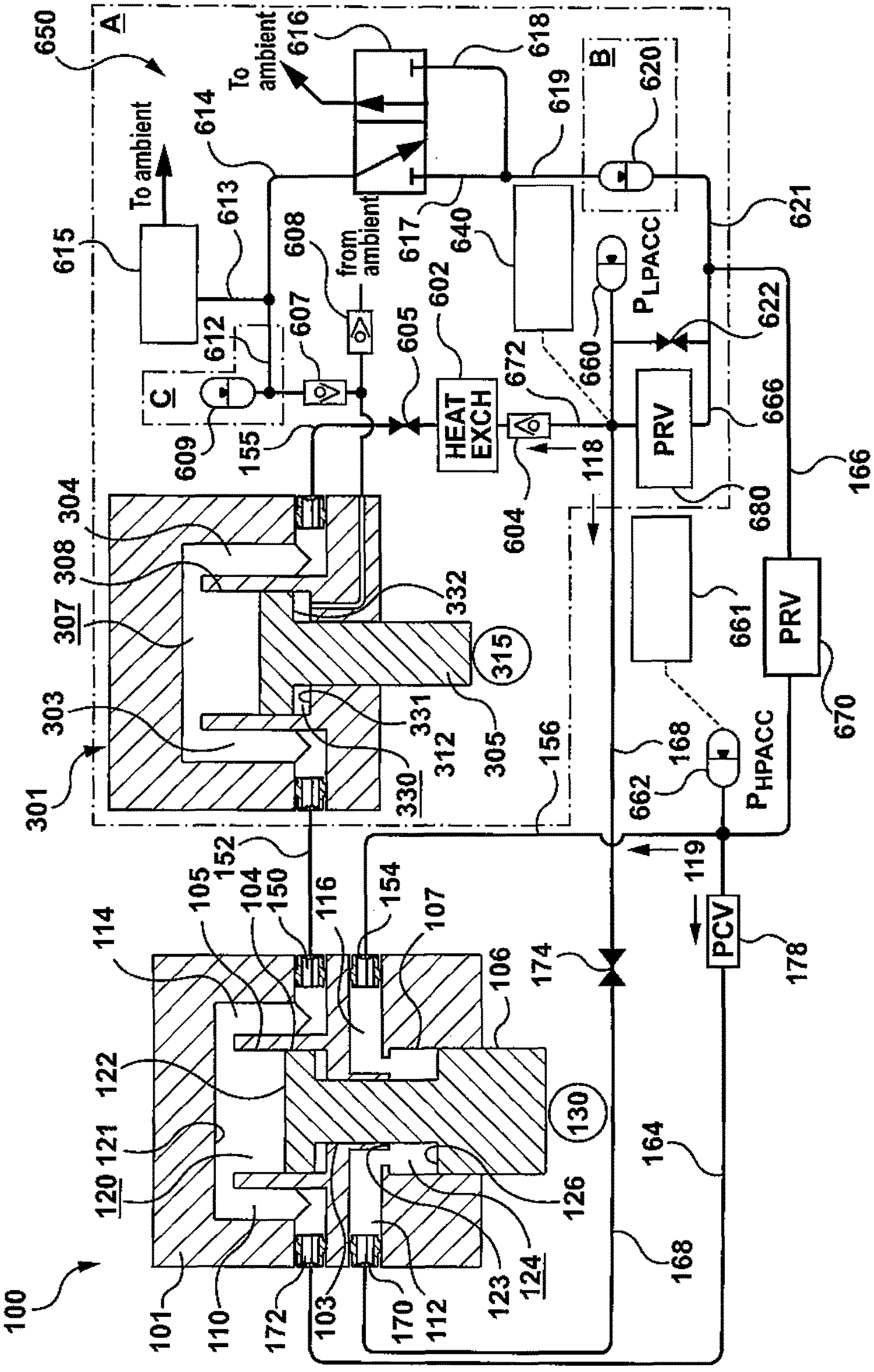
FIG. 6 shows a cross-section view of a double-decker embodiment of a self-priming pump and circuit where a first piston and a second piston are shown in their BDC position and the circuit includes a motor and a control system to facilitate pressure control within a low pressure loop and a high pressure loop.
Figure 7:
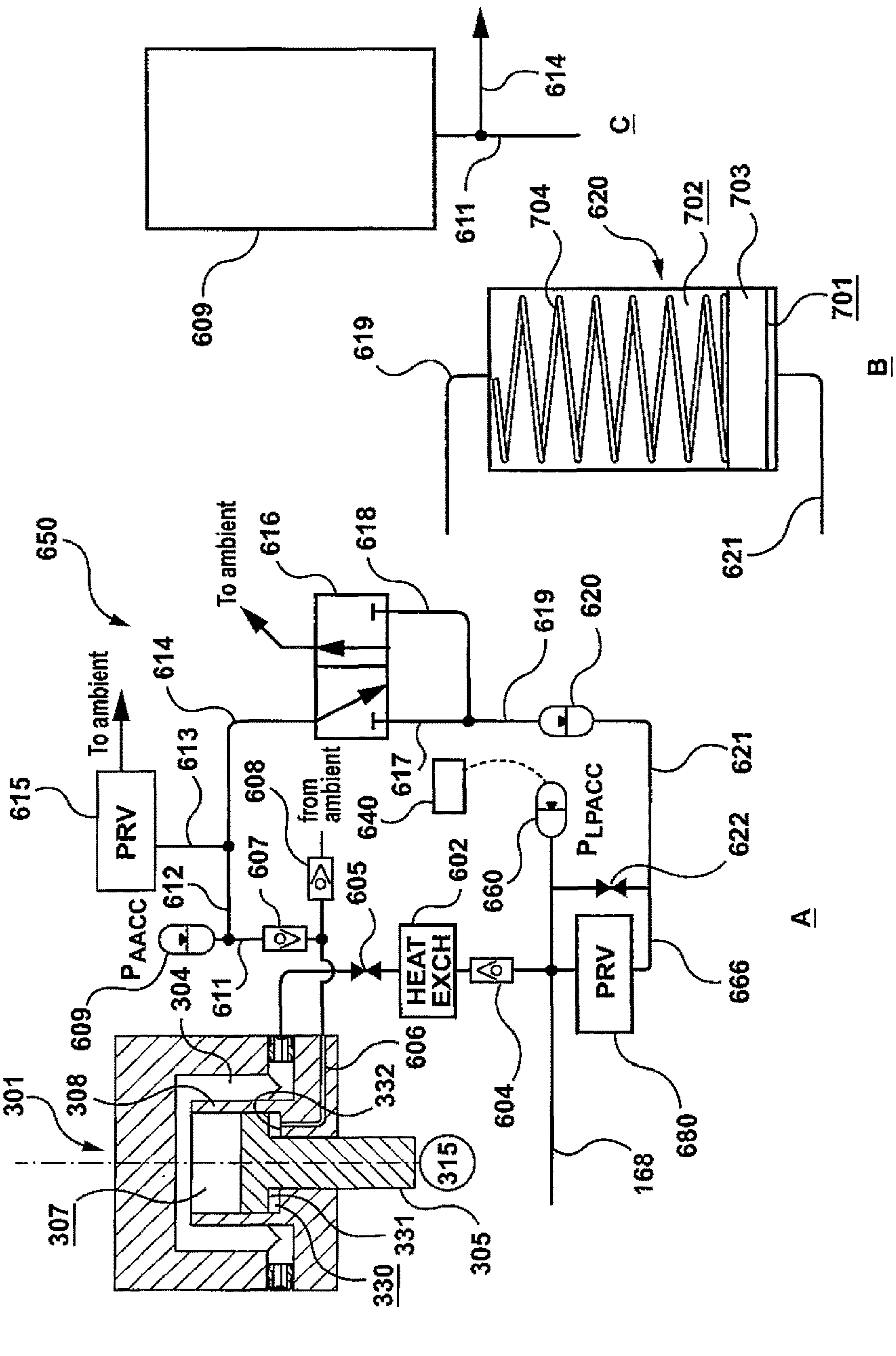
FIGS. 7A, 7B and 7C are cross-section views of portions of FIG. 6 illustrating the control system.

In FIGS. 6 and 7, hydraulic motor 301 is provided as previously described in FIGS. 3 and 4. In FIGS. 6 and 7, hydraulic motor 301 comprises capillary tube 606 which acts is a feed line to lower cavity 330 of motor 301 from ambient. Lower cavity 330 is defined by opposed and adjacent sides of motor bore 308, a lower surface 331 of piston 305 and a lower surface 332 of piston bore 308. As previously described for FIGS. 3A and 3B, motor 301 is hydraulic and non-compressible fluid is injected into motor cavity 307 from first outlet 114 at pressure $P_{1_{out}}$ during the ejection phase of first piston 104. The remaining structures of motor 301 are as previously described.

Control valve 608 is provided to control the flow of compressible fluid (e.g. air) from atmosphere through capillary tube 606 to lower cavity 330. Conversely, control valve 607 is provided to control the flow of compressible fluid out of lower cavity 330 and into reservoir 609. Compressible fluid is stored in reservoir 609 at some nominal pressure $P_{AAcc}$. Reservoir 609 is shown in greater detail in FIG. 7C. As shown in FIG. 7A, a pressure release valve 615 can be provided to allow compressible fluid stored in reservoir 609 to be returned to atmosphere if $P_{AAcc}$ becomes higher than any predefined value. In one non-limiting embodiment, $P_{AAcc}$ is set at 100 psi.

The structure of fluid support 155, valve 605 and heat exchanger 602 are as previously described for corresponding elements in FIGS. 3A and 3B. Heat exchanger 602 is fluidly connected to low pressure accumulator 660 by fluid support 672, so non-compressible fluid exiting heat exchanger 602 travels through check valve 604 and fluid support 672 before entering low pressure accumulator 660. Pressure release valve 680 is provided to control non-compressible fluid flow out of low pressure accumulator 660 and to maintain low pressure accumulator 660 at a pre-determined pressure $P_{LPAcc}$. Pressure release valve 680 is pressure actuated and facilitates flow of non-compressible fluid along fluid support 668 to dual fluid accumulator 620 (e.g. compressible fluid over non-compressible fluid), which is shown in greater detail in FIG. 7B.

Dual fluid accumulator 620 comprises (as shown in FIG. 7B) a non-compressible fluid side 701 and a compressible fluid side 702, divided by double-sealing piston 703. Compressible fluid side 702 further comprises return spring 704 to encourage double-sealing piston 703 to resist flow of incoming non-compressible fluid. Compressible fluid side 702 of dual fluid accumulator 620 is fluidly connected to fluid support 619, which in turn is fluidly connected to electronic control valve 616. To return non-compressible fluid to low pressure accumulator 660 in the event of a drop in pressure therein, a pressure increase in compressible fluid side 702 of dual fluid accumulator 620 is provided. This pressure increase is generated by actuating electronic control valve 616, which releases compressible fluid stored in reservoir 609 and directs it to fluid supports 612, 614, 617 and 619 to the compressible fluid contacting side of dual fluid accumulator 620.

Electronic control valve 616 fluidly connects to dual fluid accumulator 620 through fluid supports 617, 619 and reservoir 609 through fluid supports 612,614. Electronic control valve is configured to control the circulation of compressible fluid between reservoir 609, dual fluid accumulator 620 and atmosphere to maintain desired pressures in low pressure accumulator 660 and reservoir 609. The mechanism of action of electronic control valve 616 is described in more detail below.

Operation

In the system shown in FIG. 1, opening gate valve 174 allows pressurized non-compressible fluid to be released from low pressure accumulator 160, travel along fluid support 168 and enter second piston cavity 124 of reciprocating hydraulic pump 100 through check valve 170 and second inlet 112. Movement of non-compressible fluid into second cavity 124 drives second piston 106 downward.

Opening pressure control valve 178 also allows a controlled injection of pressurized non-compressible fluid to be released from high pressure accumulator 162, travel along fluid support 164 and enter first fluid cavity 120 through check valve 172 and first inlet 110. Movement of non-compressible fluid into first cavity 120 drives first piston 104 downward.

As second piston 106 moves downward, first piston 104 also moves downward in synchronized motion because first piston 104 and second piston 106 are coupled by couple 103, allowing first fluid cavity 120 to substantially simultaneously fill with non-compressible fluid from high pressure accumulator 162 as second fluid cavity 124 fills with non-compressible fluid from low pressure accumulator 160.

As non-compressible fluid fills first fluid cavity 120, first piston 104 moves downward towards its BDC position. As previously described, in this embodiment, second piston 106 also moves towards its BDC position as first piston 104 moves towards its BDC position. Once first and second pistons 104, 106 are at their BDC positions, an ejection phase is completed and actuator 130 drives first and second pistons back towards their respective TDC positions. Non-compressible fluid is pushed out of first outlet 114 into high pressure loop 118, and out of second outlet 116 into low pressure loop 119. Specifically, non-compressible fluid ejected from first cavity 120 passes through first outlet 114 and enters fluid support 152. Similarly, non-compressible fluid ejected from second cavity 124 passes through second outlet 116 and enters fluid support 156. Fluid support 152 carries ejected non-compressible fluid at $P_{1out}$ towards resistive element 159 and subsequently, through fluid support 155 to low pressure accumulator 160. Fluid support 156 carries ejected non-compressible fluid at $P_{2out}$ towards high pressure accumulator 162.

In high pressure loop 119, non-compressible fluid travels along fluid support 156 towards high pressure accumulator 162. Upon arriving at high pressure accumulator 162, non-compressible fluid can either continue into high pressure accumulator 162 for temporary storage, travel along fluid support 164 through pressure control valve 178 towards first fluid cavity 120, or travel along fluid support 166 through pressure release valve 180 towards low pressure accumulator 160.

Non-compressible fluid entering fluid support 164 passes through pressure control valve 178 and enters first inlet 110 through check valve 172. Pressure control valve 178 is used to control the pressure $P_{1in}$ of non-compressible fluid into first fluid cavity 120.

In low pressure loop 118, non-compressible fluid travels along fluid support 152 towards resistive element 159. Non-compressible fluid first enters resistive element 159 at $P_{1out}$. Resistive element 159 effluent enters fluid support 155 and continues towards low pressure accumulator 160 at $P_{LPAcc}$. As previously described, maximum change in pressures between $P_{1out}$ and $P_{LPAcc}$ is desired to maximize the efficiency of resistive element 159 to perform work. When non-compressible fluid reaches low pressure accumulator 160, non-compressible fluid can either enter low pressure accumulator 160 or travel along fluid support 168 towards second fluid cavity 124.

FIG. 2A shows the same system as described in FIGS. 1A and 1B, however, fluid support 152 contains pressure control valve 201.

In the embodiment illustrated in FIGS. 2A and 2B, the same operation of reciprocating hydraulic pump 100 occurs as was previously described. Pressure control valve 201 is used to control the flow of non-compressible fluid in fluid support 152. The flow of non-compressible fluid through reciprocating hydraulic pump 100 and circuit 102 remains the same as previously described for FIGS. 1A and 1B, however, heat is generated at pressure control valve 201 and a cooling system, such as heat exchanger 202, can be provided to maintain system operating temperatures.

FIG. 2B shows a cross-section of the system as described above in FIG. 2A, however, first piston 104 and second piston 106 are at their respective BDC positions. Non-compressible fluid exiting first fluid cavity 120 moves through first outlet 114 and check valve 150, through pressure control valve 201 and towards heat exchanger 202. It is recognized that any fluid resistive element could be placed in the position of pressure control valve 201, including a motor as described in FIGS. 3 and 4. As non-compressible fluid exits heat exchanger 202 it continues along fluid support 152 to low pressure accumulator 160.

FIG. 3A shows the same system as described in FIGS. 2A and 2B, however, pressure control valve 201 has been replaced by motor 301.

In FIG. 3A, an intake stroke of motor piston 305 is initiated by injecting a pressurized volume of non-compressible fluid released from first outlet 114 of first cavity 120 into low pressure loop 118. Flow control valve 321 is closed to inhibit ejection of non-compressible fluid from motor 301 and facilitate the non-compressible fluid to drive piston 305 to its BDC position. Upon reaching its BDC position, load 315 actuates piston 305 back to its TDC position exhausting the non-compressible fluid filling motor cavity 307. Flow control valve 320 (e.g. on-off valve) is closed during this exhaust stroke. Flow control valves 320, 321 can be electronically controlled. FIG. 3B shows the same system as described in FIG. 3A, however, first piston 104, second piston 106 and motor piston 305 are at their BDC positions. It should be understood that during normal operating conditions, pistons 104, 106 of pump 100 and motor piston 305 can be at different phases of their respective stroke. For example, the stroke of pistons 104, 106 of pump 100 and motor piston 305 can be offset 180 degrees.

FIG. 4A shows the same system as described in FIGS. 3A and 3B, however, pressure control valve 178 is a pressure control valve 478 to control an amount of non-compressible fluid entering first fluid cavity 120 from high pressure accumulator 162. In this embodiment, intake and exhaust of non-compressible fluid from piston bores 105, 107 are the same as described previously in FIGS. 3A and 3B.

As non-compressible fluid is ejected from second fluid cavity 124, it travels along fluid support 158 towards high pressure accumulator 162. As previously described, fluid support 496 can be used to join non-compressible fluid ejected from second fluid cavity 124 with non-compressible fluid ejected from first fluid cavity 120 upstream of motor 301. This configuration can be used in applications where an increase in power output from motor 301 is desired such as but not limited to during acceleration of a vehicle.

By closing gate valve 492 and opening gate valve 497, non-compressible fluid ejected from second fluid cavity 124 can be taken out of high pressure loop 119 to join non-compressible fluid in low pressure loop 118 upstream of motor 301. Closing gate valve 492 inhibits flow of non-compressible from second fluid cavity 124 towards high pressure accumulator 162. Opening gate valve 497 facilitates joining non-compressible fluid ejected from second fluid cavity 124 with non-compressible fluid ejected from first fluid cavity 120 heading to motor 301. Non-compressible fluid ejected from second fluid cavity 124 can therefore temporarily bypass a portion of high pressure loop 119 when valve 492 is closed and valve 497 is opened. As previously noted, valves 492 and 497 can be combined into a single three-way valve (not shown).

When non-compressible fluid ejected from second fluid cavity is directed to join non-compressible fluid ejected from first fluid cavity 120 heading to motor 301, any non-compressible fluid ejected from motor 301 can be put back into high pressure loop 119 downstream of valve 492 (or downstream of a three-way valve if used in place of valves 492, 497) with fluid support 498 and valve 499. In FIG. 4A, fluid support 498 fluidly couples fluid support 168 and fluid support 164. Valve 499 can be opened in combination with opening valve 497 and closing valve 492 as previously described. Opening valve 499 directs a portion of non-compressible fluid ejected from motor 301 into low pressure loop 118 downstream of valve 492. In FIG. 4A, the position of fluid support 498 creates a temporary bypass of high pressure accumulator 162 as non-compressible fluid is directed into low pressure loop 118 from high pressure loop 119 downstream of high pressure accumulator 162. As previously described, it is desirable to direct a portion of non-compressible fluid ejected from motor 301 into high pressure loop 119 downstream of valve 492 and upstream of first fluid inlet 110 to inhibit first fluid cavity 120 from developing a vacuum, which could occur if an insufficient volume of non-compressible fluid was present in first fluid cavity 120 during a downstroke of first piston 104.

FIG. 4A also shows pressure control valve 478 which can control the flow of non-compressible fluid injected into first fluid cavity 120 from second fluid outlet 116 and the pressure of high pressure accumulator 162 as previously described.

FIG. 4B shows the same system as described in FIG. 4A, however, first piston 104, second piston 106 and motor piston 305 are at their BDC positions.

FIG. 5 shows another exemplary configuration of a self-priming hydraulic system. In this side-by-side configuration, reciprocating hydraulic pumps 500A and 500B comprise first housing 501 and second housing 501B, respectively. First piston bore 505 is disposed in first housing 501 and second piston bore 507 is disposed in second housing 501B. Circuit 502 is not illustrated in FIG. 5A, however, it is understood that first inlet 510 is fluidly connected to second outlet 516 and second inlet 512 is fluidly connected to first outlet 514, as previously described.

FIG. 5B shows a cross-section view of a side-by-side embodiment of a self-priming hydraulic system where a first piston 504 and a second piston 506 are shown at their BDC positions and low pressure loop 518 includes a fluid resistive element 590 and a heat exchanger 591. Operation of the side-by-side embodiment shown in FIGS. 5A and 5B is substantially similar to as previously described for FIGS. 1A and 1B, except that first piston 504 and second piston 506 can be configured such that they approach their respective TDC and BDC positions at substantially the same time or substantially opposite times. For instance, when piston 504 approaches TDC, piston 506 can be configured to approach either its TDC or BDC positions.

FIG. 6 shows a cross-section view of a double-decker embodiment of a self-priming hydraulic system where a first piston 104 and a second piston 106 are shown in their BDC position and a motor 301 and a control system 650 facilitate pressure control in low pressure accumulator 660 and high pressure accumulator 662. Portions A, B and C illustrated on FIG. 6 are shown in more detail in FIGS. 7A, 7B and 7C, respectively.

Referring to FIG. 7A, capillary tube 606 is a feed line to lower side of piston 305 of motor 301. As previously described for FIGS. 3A and 3B, motor 301 is hydraulic and non-compressible fluid is injected into motor cavity 307 from first outlet 114 during the ejection phase of first piston 104.

Compressible fluid is drawn into a lower cavity 330 through capillary tube 606 and control valve 608. In one embodiment, control valve 608 can lead to atmosphere.

Compressible fluid is used to fill lower cavity 330 as motor piston 305 moves from its BDC position to its TDC position.

During a downstroke of motor piston 305 from TDC to BDC, compressible fluid in lower cavity 330 is forced out of lower cavity 330 through capillary tube 606 and control valve 607 and into reservoir 609. Compressible fluid is stored in reservoir 609 at some predefined pressure $P_{AAcc}$. Reservoir 609 is shown in greater detail in FIG. 7C. Pressure release valve 615 is dedicated to reservoir 609 to provide pressure control for reservoir 609. If pressure $P_{AAcc}$ in reservoir 609 rises above a predefined value, the excess fluid pressure opens pressure release valve 615 and compressible fluid is exhausted to ambient. Compressible fluid (e.g. air) drawn from ambient into lower cavity 330 passes through check valve 608. Compressible fluid forced out of lower cavity 330 into reservoir 609 passes through check valve 607.

Non-compressible fluid in fluid cavity 307 of motor 301 is ejected through motor outlet 304 during an upstroke of motor piston 305 to its TDC position from its BDC position. After passing through motor outlet 304, non-compressible fluid travels through fluid support 155 and valve 605 to heat exchanger 602. Heat exchanger 602 is fluidly connected to low pressure accumulator 660 by fluid support 672, so when non-compressible fluid exits heat exchanger 602 it travels through control valve 604 and fluid support 672 before entering low pressure accumulator 660. To allow low pressure accumulator 660 to be maintained at a pre-determined pressure, pressure release valve 680 is provided. When pressure release valve 680 is forced open by excessive pressure, non-compressible fluid can flow along fluid support 666 to dual fluid accumulator 620, which is shown in greater detail in FIG. 7B.

Dual fluid accumulator 620 (as shown in FIG. 7B) comprises a non-compressible fluid side 701 and a compressible fluid side 702, divided by double-sealing piston 703. Compressible fluid side 702 further comprises return spring 704 to encourage double-sealing piston 703 to tend to resist flow of incoming non-compressible fluid into non-compressible fluid side 701. Compressible fluid side 702 of dual fluid accumulator 620 is fluidly connected to fluid support 619, which in turn is fluidly connected to electronic control valve 616. To return non-compressible fluid to low pressure loop 118 (see FIG. 6) in the event of a drop in pressure in low pressure loop 118, a pressure increase is provided in the compressible fluid side 702 of dual fluid accumulator 620. An increase in compressible fluid pressure is generated by actuating electronic control valve 616, which releases compressible fluid stored in reservoir 609 and directs it along fluid supports 612, 614, 617 and 619 to compressible fluid side 702 of dual fluid accumulator 620.

Upon a drop in pressure in low pressure loop 118 (see FIG. 6) or low pressure accumulator 660 below a pre-determined pressure, non-compressible fluid is released from dual fluid accumulator 620 by opening valve 622 and closing valve 616. Compressible fluid enters compressible fluid side 702 of dual fluid accumulator 620 and actuates double-sealing piston 703 such that non-compressible fluid in non-compressible fluid side 701 is forced out of dual fluid accumulator 620 and into fluid support 621. Non-compressible fluid passes through valve 622 and enters low pressure accumulator 660. It should be noted that valve 622 is typically closed. It should also be understood that non-compressible fluid forced from dual fluid accumulator 620 can also enter fluid support 168 through valve 622 at a position between gate valve 174 and second inlet 112 (not shown). In this embodiment, non-compressible fluid can be injected into low pressure loop 118 even if gate valve 174 is closed.

It should be understood that dual fluid accumulator 620 is not intended to maintain a pressurized supply of compressible fluid in compressible fluid side 702. While non-compressible fluid is being stored in non-compressible fluid side 701, rather, dual fluid accumulator 620 is intended to receive compressible fluid from reservoir 609 when delivery of non-compressible fluid from non-compressible fluid side 701 to low pressure accumulator 660 is desired. Dual fluid accumulator 620 therefore acts as a temporary storage unit for both high pressure accumulator 662 and low pressure accumulator 660 to allow each to continuously operate at predefined settings despite thermal expansion of non-compressible fluid therein. Dual fluid accumulator 620 facilitates the continuous operation of low pressure accumulator 660 and high pressure accumulator 662 by accepting and storing increased volumes of non-compressible fluid from thermal expansion.

Electronic control valve 616 is configured to communicate with pressure transducer 640 at low pressure accumulator 660 such that when $P_{LPAcc}$ in low pressure accumulator 660 either drops below or raises above a predefined pressure, an electronic signal is sent to electronic control valve 616 to change electronic control valve 616 between an on and an off position. In one embodiment, the desired pressure $P_{LPAcc}$ is 100 psi.

Electronic control valve 616 is configured such that when it is in the off position, compressible fluid temporarily injected in compressible fluid side 702 of dual fluid accumulator 620 can pass through fluid supports 618, 619 to atmosphere. If $P_{LPAcc}$ raises above a predefined pressure, pressure release valve 680 is opened by the non-compressible fluid and non-compressible fluid flows from low pressure accumulator 660 through fluid support 666 to dual fluid accumulator 620 to relieve the pressure in low pressure accumulator 660. Conversely, compressible fluid stored in reservoir 609 can flow to electronic control valve 616 and dual fluid accumulator 620 via fluid supports 612, 614 when electronic control valve 616 is switched on, increasing the pressure $P_{LPAcc}$ by forcing non-compressible fluid to flow from dual fluid accumulator 620 through fluid support 621 and valve 622 to low pressure loop 118.

Pressure transducers 640 and 661 are provided to monitor pressures in low pressure accumulator 660 and high pressure accumulator 662, respectively. If pressure $P_{LPAcc}$ rises above its predefined value, pressure release valve 680 is opened by non-compressible fluid and excess non-compressible fluid flows from low pressure loop 118 to non-compressible fluid side 701 of dual fluid accumulator 620. Likewise, if pressure $P_{HPAcc}$ rises above its predefined value, pressure release valve 670 is opened by non-compressible fluid and excess non-compressible fluid flows from high pressure loop 119 to non-compressible fluid side 701 of dual fluid accumulator 620.

If pressure $P_{LPAcc}$ in low pressure accumulator 660 is too low, pressure transducer 640 signals electronic control valve 616 and control valve 622 to open, thereby facilitating non-compressible fluid flow out of non-compressible fluid side 701 of dual fluid accumulator 620 through fluid support 621 and valve 622 to low pressure loop 118. Similarly, if pressure $P_{HPAcc}$ in high pressure accumulator 662 is too low, pressure transducer 640 signals electronic control valve 616 and control valve 622 to open, thereby allowing non-compressible fluid to flow out of non-compressible fluid side

701 of dual fluid accumulator 620 through fluid support 621 and valve 622 to low pressure loop 118.

In another embodiment not shown, compressible fluid can be supplied to electronic control valve 616 directly from an external fluid source. In this configuration, an external fluid source is fluidly coupled to electronic control valve 616 directly through fluid support 614. This configuration can be used when motor 301 does not comprise capillary tube 606 (e.g. motor 301 is a double-acting motor), or capillary tube 606 is not fluidly connected to electronic control valve 616. In such a configuration, check valves 607, 608, reservoir 609 and pressure release valve 615 can be removed from the system.

I claim:

1. A self-priming hydraulic system comprising:

a reciprocating hydraulic pump for pumping non-compressible fluid, the reciprocating hydraulic pump comprising:

a first piston operable to reciprocate within a first piston bore, the first piston bore co-operating with a top surface of the first piston to define a first fluid cavity, the first piston bore providing a first fluid inlet and a first fluid outlet disposed on the first piston bore and fluidly coupled to the first fluid cavity, and a second piston operable to reciprocate within a second piston bore, the second piston bore co-operating with a top surface of the second piston to define a second fluid cavity, the second piston bore providing a second fluid inlet and a second fluid outlet disposed on the second piston bore and fluidly coupled to the second fluid cavity, a low pressure loop including a low pressure accumulator fluidly coupled between the first fluid outlet and the second fluid inlet of the hydraulic pump, and a high pressure loop including a high pressure accumulator fluidly coupled between the second fluid outlet and the first fluid inlet of the hydraulic pump.

2. The self-priming hydraulic system of claim 1, wherein the low pressure loop comprises a resistive element fluidly coupled between the low pressure accumulator and the first fluid outlet of the reciprocating hydraulic pump.

3. The self-priming hydraulic system of claim 2, wherein the resistive element is a hydraulic motor.

4. The self-priming hydraulic system of claim 3, wherein the hydraulic motor is a reciprocating hydraulic motor.

5. The self-priming hydraulic system of claim 1, wherein the first piston and the second piston are arranged in a stacked configuration such that the first piston is coupled to the second piston by a stem.

6. The self-priming hydraulic system of claim 1, wherein a relief support fluidly couples the high pressure accumulator to the low pressure accumulator.

7. The self-priming hydraulic system of claim 2, wherein the low pressure loop further comprises a heat exchanger fluidly coupled between the resistive element and the low pressure accumulator.

8. The self-priming hydraulic system of claim 4, wherein the reciprocating hydraulic motor comprises a capillary tube fluidly coupled to a compressible fluid storage tank.

9. The self-priming hydraulic system of claim 8, wherein a dual fluid accumulator is fluidly coupled between the compressible fluid storage tank and the low pressure loop.

10. The self-priming hydraulic system of claim 2, wherein a first fluid support fluidly couples the high pressure loop to the low pressure loop upstream of the resistive element to direct non-compressible fluid from the high pressure loop to the low pressure loop, and a second fluid support fluidly couples the low pressure loop downstream of the resistive element to the high pressure loop to direct non-compressible fluid from the low pressure loop to the high pressure loop.

11. A self-priming hydraulic system comprising:

a hydraulic pump, the hydraulic pump comprising:

a first piston operable to reciprocate within a first piston bore, the first piston bore co-operating with a top surface of the first piston to define a first fluid cavity, the first piston bore providing a first fluid inlet and a first fluid outlet disposed on the first piston bore and fluidly coupled to the first fluid cavity, and a second piston operable to reciprocate within a second piston bore, the second piston bore co-operating with a top surface of the second piston to define a second fluid cavity, the second piston bore providing a second fluid inlet and a second fluid outlet disposed on the second piston bore and fluidly coupled to the second fluid cavity, and a low pressure loop defined by a low pressure accumulator fluidly coupled to the first fluid inlet and the first fluid outlet of the hydraulic pump with a high pressure loop defined by a high pressure accumulator fluidly coupled to the second fluid inlet and the second fluid outlet of the hydraulic pump utilizing a first fluid support coupling the first fluid outlet with the second fluid outlet via a first valve and a second fluid support coupling the first fluid inlet with the second fluid inlet via a second valve.

* * * * *